(12) United States Patent
Yazawa et al.

(10) Patent No.: US 7,392,577 B2
(45) Date of Patent: Jul. 1, 2008

(54) METHOD FOR MANUFACTURING A PERPENDICULAR MAGNETIC HEAD

(75) Inventors: Hisayuki Yazawa, Niigata-ken (JP); Kiyoshi Kobayashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 314 days.

(21) Appl. No.: 10/937,646

(22) Filed: Sep. 9, 2004

(65) Prior Publication Data
US 2005/0057852 A1     Mar. 17, 2005

(30) Foreign Application Priority Data
Sep. 12, 2003  (JP) .............................. 2003-321954

(51) Int. Cl.
*G11B 5/187* (2006.01)
(52) U.S. Cl. ............... 29/603.12; 29/603.13; 29/603.15; 29/603.18; 360/122; 360/119.01; 360/125.03
(58) Field of Classification Search . 29/603.11–603.16, 29/603.18, 603.23; 360/119, 122, 125, 126, 360/119.01, 119.11, 125.03, 125.06
See application file for complete search history.

(56) References Cited

U.S. PATENT DOCUMENTS 5,793,578 A * 8/1998 Heim et al. ................. 360/126
6,081,408 A * 6/2000 Partee ................. 29/603.15 X

FOREIGN PATENT DOCUMENTS

| JP | 2-201710 | 8/1990 |
|---|---|---|
| JP | 7-311917 | * 11/1995 |
| JP | 10-320720 | 12/1998 |

OTHER PUBLICATIONS

IEEE Transactions On Magnetics, vol. 38, No. 4, Jul. 2002, *One Terabit Per Square Inch Perpendicular Recording Conceptual Design*, by M. Mallary, A. Torabi, and M. Benakli.
Notification of Reasons for Refusal for corresponding Japanese Patent Application Serial No. 2003-321954, dated Jul. 10, 2007.

* cited by examiner

*Primary Examiner*—A. Dexter Tugbang
(74) *Attorney, Agent, or Firm*—Brinks Hofer Gilson & Lione

(57) ABSTRACT

A method of manufacturing a perpendicular magnetic head is disclosed, including perpendicular magnetic recording head includes forming a primary magnetic pole having a flat top surface, where a shield layer over the primary magnetic pole and at the sides of the primary magnetic pole is formed in a single piece. The distance in the direction perpendicular to the thickness direction between the side surfaces of the primary magnetic pole and the side shield layer is longer than the distance in the thickness direction between the top surface of the primary magnetic pole and the shield layer.

5 Claims, 24 Drawing Sheets

METHOD FOR MANUFACTURING A PERPENDICULAR MAGNETIC HEAD

This application claims the benefit of priority to Japanese Patent Application No. 2003-321954 filed on Sep. 12, 2003, herein incorporated by reference.

BACKGROUND OF THE INVENTION

1. Field of the Invention

The present invention relates to perpendicular magnetic recording heads which apply a perpendicular magnetic field to a recording medium, such as a disk with a hard layer, to record data on the medium. In particular, the invention relates to a perpendicular magnetic recording head including a primary magnetic pole having a flat top surface and an integrated shield layer including side shields disposed at the sides of the primary magnetic pole and an upper shield disposed over the primary magnetic pole, and to a method for manufacturing the perpendicular magnetic recording head. The magnetic recording head having such a structure exhibits low noise, and prevents side fringing and erasure of recorded signals.

2. Description of the Related Art

Perpendicular magnetic recording is one of the techniques for high-density recording of magnetic data on a recording medium, such as a disk. Perpendicular magnetic recording has an advantage in high-density recording in comparison with horizontal magnetic recording.

For high-density recording, the intervals between recording tracks are reduced as the track width Tw of the primary magnetic pole is reduced. Accordingly, perpendicular magnetic recording heads adaptable to high-density recording make worse the problems of write fringing in recording media resulting from the spread of magnetic flux generated for writing from the primary magnetic pole and of erasing recorded signals in the adjacent recording tracks.

In view of such circumstances, some perpendicular magnetic recording heads have been developed which are provided with shields absorbing flux (side flux) spread to the sides of the magnetic pole before the flux reaches the recording medium so as to prevent the side flux from writing onto a recording medium and thus suppress write fringing and erasure of recorded signals.

In order to absorb a large amount of side flux in this magnetic head, it is preferable that not only the side shields be provided at both sides of the primary magnetic pole, but also an upper shield be provided over the primary magnetic pole.

The primary magnetic pole is often formed by plating. Unfortunately, the resulting top surface of such a magnetic pole bulges, and it is thus difficult to form a flat surface. A non-flat upper surface of the primary magnetic pole distorts signals to be recorded and thus hinder accurate recording on recording media, consequently causing noise during reproduction of the recorded signals. It is therefore preferable that the top surface of the primary magnetic pole be formed flat.

A perpendicular magnetic recording head having this structure has been disclosed in a non-patent document One Terabit Per Square Inch Perpendicular Recording Conceptual Design, IEEE TRANSACTIONS ON MAGNETICS, Vol. 38, No. 4, July 2002 (particularly in FIG. 4) and a patent document Japanese Unexamined Patent Application Publication No. 2-201710 (particularly in FIG. 16B).

In order for the side shields and the upper shield to absorb a large amount of side flux, it is necessary to increase the total flux absorption of the shields. Hence, the side shields and the upper shield are formed in a single piece rather than in separated pieces.

The non-patent document proposes a perpendicular magnetic recording head having side shields and an upper shield which are integrated into one piece. However, this document does not teach how the structure is provided.

In order to integrate the side shields with the upper shield, the following process, as shown in FIGS. 26 to 28, is generally applied.

FIGS. 26 to 28 are fragmentary front views showing a process for manufacturing a perpendicular magnetic recording head having side shields and an upper shield formed in a single piece.

First, after forming a plating base layer 102 on a nonmagnetic material layer 101, a magnetic material is deposited to form a primary magnetic pole 103 on the plating base layer 102 by frame plating or the like, as shown in FIG. 26.

Turning to FIG. 27, another nonmagnetic material layer 104 is formed over the primary magnetic pole 103 from the top to the sides, and a gap layer 105 is further provided over the nonmagnetic material layer 104.

Then, a shield layer 106 made of a magnetic material is formed over the gap layer 105 from above the primary magnetic pole 103 to the sides, as shown in FIG. 28. The shield layer 106 is cut to a predetermined height (for example, along line D-D in the figure). Thus, an integrated shield serving as side shields and an upper shield is provided.

However, the top surface of the primary magnetic pole 103 of this magnetic head is undesirably formed in a convex shape in the step shown in FIG. 26. Consequently, the resulting perpendicular magnetic recording head distorts record signals to increase noise.

It is therefore considered that the top surface of the primary magnetic pole 103 of the non-patent document is not flat and is accordingly liable to produce noise.

In order to flatten the top surface of the primary magnetic pole 103, the following process is generally applied.

FIGS. 29 to 34 are fragmentary front views showing a process for manufacturing a perpendicular magnetic recording head whose primary magnetic pole has a flat top surface.

First, after forming a plating base layer 102 on a nonmagnetic material layer 101, a magnetic material is deposited to form a primary magnetic pole 103 on the plating base layer 102 by frame plating or the like, as shown in FIG. 29.

Turning to FIG. 30, another nonmagnetic material layer 104 is formed over the primary magnetic pole 103 from the top surface to the sides. Then, a first shield layer 110 is formed of a magnetic material over the nonmagnetic material layer 104, as shown in FIG. 31. The first shield layer 110 is cut along line D-D, shown in FIG. 31, together with the upper portion of the primary magnetic pole 103 so that a flat top surface 103a of the primary magnetic pole 103 is exposed at the surface of the first shield layer 110, as shown in FIG. 32.

Then, a gap layer 105 is formed over the first shield layer 110 and the upper surface 103a of the primary magnetic pole 103.

Turning to FIG. 34, a second shield layer 111 is formed over the gap layer 105 and is subsequently cut to a predetermined height (for example, along line D-D in the figure). Thus, the flat top surface 103a is provided to the primary magnetic pole 103 of the perpendicular magnetic recording head.

In the resulting perpendicular magnetic recording head shown in FIG. 34, the first shield layer 110 serves as the side shields and the second shield layer 111 serves as the upper shield.

However, since the first shield layer 110 and the second shield layer 111 are separated by the gap layer 105, they will be magnetically saturated in a short time. Thus, the shields cannot absorb a large amount of side flux as a whole, and consequently cannot prevent side fringing or erasure of recorded signals effectively.

The above-mentioned patent document discloses a perpendicular magnetic recording head having side shields disposed at both sides of the primary magnetic pole and an upper shield disposed over the primary magnetic pole in FIG. 16B of the document. The side shields and the upper shields in this structure are also separated. Although the patent document does not clearly describe the process for manufacturing such a perpendicular magnetic recording head, the head is considered to be made through the foregoing steps shown in FIGS. 29 to 34. Thus, the shields of the patent document do not also absorb a large amount of side flux as a whole, and consequently cannot prevent side fringing or erasure of recorded signals effectively As described above, in a perpendicular magnetic recording head having an integrated shield serving as side shields and an upper shield, the primary magnetic pole inevitably has a convex top surface, and such a non-flat top surface distorts record signals to increase noise. On the other hand, in a perpendicular magnetic recording head whose primary magnetic pole has a flat top surface, the side shields and the upper shield are inevitably separated, and consequently cannot prevent side fringing or erasure of recorded signals effectively.

Hence, to flatten the top surface of the primary magnetic pole and to form the side shield and the upper shield in a single piece have been mutually contradictory.

SUMMARY OF THE INVENTION

Accordingly, an object of the present invention is to provide a perpendicular magnetic recording head including a primary magnetic pole having a flat top surface and an integrated shield layer including side shields disposed at both sides of the primary magnetic pole and an upper shield disposed over the magnetic pole, and a method for manufacturing the perpendicular magnetic recording head. The magnetic recording head having such structure exhibits low noise, and prevents side fringing and erasure of recorded signals.

According to an aspect of the present invention, a perpendicular magnetic recording head is provided which includes a first magnetic portion including a primary magnetic pole with a track width, a second magnetic portion with a width larger than the track width. The primary magnetic pole is disposed at a surface opposing a recording medium and having a flat top surface. The second magnetic portion is separated from the first magnetic portion by a gap in a region and directly or indirectly coupled with the first magnetic portion in a region away in the height direction from the surface opposing the recording medium. A coil layer is disposed in the gap, and wound around the first magnetic portion. The first magnetic portion generates a magnetic field to record magnetic data onto the recording medium. The perpendicular magnetic recording head also includes a shield layer disposed at least over the primary magnetic pole and at the sides of the primary magnetic pole in a single piece with a nonmagnetic material layer therebetween.

The primary magnetic pole of the perpendicular magnetic recording head of the present invention has a flat top surface. If the top surface of the primary magnetic pole is not flat and is formed in curved manner or convex shape, magnetic data or record signals are distorted and recorded inaccurately. Consequently, noise occurs during reproduction of the recorded signals. In contrast, the primary magnetic pole of the present invention has a flat top surface. Such a flat top surface prevents record signals from being distorted, effectively, and thus prevents the occurrence of noise during reproduction of the recorded signals.

The shield layer covering the primary magnetic pole is formed in a single piece over the primary magnetic pole and at the sides of the primary magnetic pole. Hence, the shield layer is disposed not only at the sides of the primary magnetic pole, but also over the top surface, thus integrally including side shield portions and an upper shield portion. The side shield portions correspond to the side shield of the known perpendicular magnetic recording head; the upper shield portion corresponds to the upper shield. The perpendicular magnetic recording head of the present invention has such an integrated shield layer including the side shields and the upper shield.

Accordingly, the entirety of the shield layer can be formed in a large size to increase the absorption of magnetic flux. Thus, if recording flux generated from the first magnetic portion for writing spreads to the sides of the first magnetic portion, the spread flux (side flux) can be easily absorbed. Consequently, the shield layer can absorb side flux before the side flux reaches a recording medium, so that signals based on the side flux are not recorded onto the recording medium. Thus, the structure of the present invention can prevent write fringing in recording media, erasure of signals recorded in the adjacent recoding tracks, and other problems.

Preferably, the distance in the width direction between the side surface of the primary magnetic pole and the shield layer is longer than the distance in the thickness direction between the top surface of the primary magnetic pole and the shield layer.

If the distance between the primary magnetic pole and the side shield portion is excessively short, magnetic flux required for writing onto a recording medium is also absorbed to degrade recording efficiency. By setting the distance in the width direction between the side surface of the primary magnetic pole and the shield layer to be longer than the distance in the thickness direction between the top surface of the primary magnetic pole and the shield layer, excessive absorption of recording flux is prevented, and thus recording efficiency is prevented from decreasing.

According to another aspect, the present invention provides a method for manufacturing a perpendicular magnetic recording head which includes a first magnetic portion including a primary magnetic pole with a track width disposed at a surface opposing a recording medium; a second magnetic portion with a width larger than the track width, separated from the first magnetic portion by a gap in a region and directly or indirectly coupled with the first magnetic portion in a region away in the height direction from the surface opposing the recording medium; a coil layer disposed in the gap, wound around the first magnetic portion, and in which the first magnetic portion generates a magnetic field to record magnetic data onto the recording medium. The method includes the steps of: (a) forming the first magnetic portion of a magnetic material; (b) flattening at least the top surface of the primary magnetic pole; (c) providing a nonmagnetic material layer at least over the primary magnetic pole from the top surface to the sides of the primary magnetic pole; and (d) forming a shield layer at least over the primary magnetic pole and at the sides of the primary magnetic pole in a single piece with the nonmagnetic material layer therebetween.

Since the method of the present invention includes the step of flattening the top surface of the primary magnetic pole, a primary magnetic pole having a flat top surface is provided. A non-flat upper surface of the primary magnetic pole distorts record signals to hinder accurate recording on recording media, consequently causing noise during reproduction of the recorded signals. Since the method of the present invention provides a primary magnetic pole having a flat top surface, the resulting perpendicular magnetic recording head can prevent record signals from being distorted, effectively, and thus prevents the occurrence of noise during reproduction of the recorded signals.

The method of the present invention also includes the step of forming the shield layer over the primary magnetic pole and at the sides of the primary magnetic pole in a single piece.

Thus, the shield layer provides side shield portions and an upper shield portion in a single piece. Hence, the method of the present invention integrates the portions corresponding to the side shields of the known perpendicular magnetic recording head with the portion corresponding to the upper shield into a single piece. Accordingly, the shield layer can be formed in such a large size as to easily absorb flux (side flux) spread to the sides of the primary magnetic pole. Consequently, the shield layer can absorb side flux before the side flux reaches a recording medium, so that signals based on the side flux are not recorded onto the recording medium. Thus, such a structure can prevent write fringing in recording media, erasure of signals recorded in the adjacent recoding tracks, and other problems.

Thus, the method of the present invention can simultaneously achieve a flattened top surface of the primary magnetic pole and an integrated shield layer including the side shields and the upper shield.

Preferably, the nonmagnetic material layer is formed so that the thickness in the width direction on the side surfaces of the primary magnetic pole is larger than the thickness on the top surface of the primary magnetic pole.

If the distance between the primary magnetic pole and the side shield portion of the shield layer is excessively short, magnetic flux required for writing onto a recording medium is also absorbed to degrade recording efficiency. In the method of the present invention, the portion above the primary magnetic pole of the nonmagnetic material layer is cut so as to flatten the top surface of the primary magnetic pole, and then the thickness in the width direction on the side surfaces of the primary magnetic pole is increased to be larger than the thickness on the top surface of the primary magnetic pole. Thus, the distance between the side surfaces of the primary magnetic pole and the shield layer can be set longer than the distance between the top surface of the primary magnetic pole and the shield layer. Consequently, recording flux generated from the primary magnetic pole is not excessively absorbed in the shield layer.

Step (c) may include the sub steps of: (e) forming a first nonmagnetic material layer over the primary magnetic pole from the top surface to the sides of the primary magnetic pole; (f) cutting an upper portion of the first nonmagnetic material layer so as to expose the top surface of the primary magnetic pole, thereby flattening the top surface of the primary magnetic pole; and (g) forming a second nonmagnetic material layer over the primary magnetic pole and the remaining first nonmagnetic material layer.

Thus, the shield layer is provided at the sides of the primary magnetic pole with the first and second nonmagnetic material layers therebetween, and over the primary magnetic pole with only the first nonmagnetic material layer therebetween. Thus, since the distance between the side surface of the primary magnetic pole and the shield layer can be set longer than the distance between the top surface of the primary magnetic pole and the shield layer, the shield layer does not excessively absorb recording flux generated from the magnetic portion.

Preferably, step (c) further includes the sub steps of: (h) forming a third nonmagnetic material layer over the first nonmagnetic material layer before sub step (f); and (i) removing the third nonmagnetic material layer before sub step (g). The first nonmagnetic material layer and the third nonmagnetic material layer are cut, in sub step (f), until the top surface of the primary magnetic pole is exposed, thereby flattening the top surfaces of the primary magnetic pole and the third nonmagnetic material layer.

In step (c), the first and third nonmagnetic material layers are cut until the top surface of the primary magnetic pole is exposed. This easily prevents the primary magnetic pole from breaking, and accordingly the top surface of the magnetic pole is easily exposed. The sub step of removing the third nonmagnetic material layer before sub step (g) facilitates precise formation of a space for forming the shield layer at the sides of the primary magnetic pole.

Preferably, in sub step (h), the third nonmagnetic material layer is formed beyond the height of the primary magnetic pole.

Thus, the primary magnetic pole is further prevented from breaking.

The third nonmagnetic material layer may be formed of a material capable of being etched by reactive ion etching.

Such a third nonmagnetic material layer is easy to remove.

In this instance, the first nonmagnetic material layer may be formed of at least one material selected from the group consisting of $Al_2O_3$, AlSiO, and AlSiON, and the third nonmagnetic material layer may be formed of at least one material selected from the group consisting of $SiO_2$, $Ta_2O_5$, Ti, W, Cr, Ta, and oxides and nitrides of Ti, W, Cr, and Ta.

The method may further include the step of forming a nonmagnetic shield bank layers in regions a predetermined distance away in the width direction from the sides of the primary magnetic pole, between steps (a) and (d). In step (d), the shield layer is provided in a single piece over the primary magnetic pole, at the sides of the primary magnetic pole, and over the shield bank layer.

Thus, the distance between the second magnetic portion and the shield layer increases by the thickness of the shield bank layer.

Steps (b) and (c) may be performed through the following sub steps: (j) forming a first nonmagnetic material layer over the primary magnetic pole from the top surface to the side surfaces of the primary magnetic pole; (k) forming a fourth nonmagnetic material layer over the first nonmagnetic material layer; (l) removing portions of the fourth nonmagnetic material layer a predetermined distance away from the sides of the primary magnetic pole and forming a fifth nonmagnetic material layer over the fourth nonmagnetic material layer and in the regions where the fourth nonmagnetic material layer is removed; (m) cutting the fifth nonmagnetic material layer and the fourth nonmagnetic material layer until the top surface of the primary magnetic pole is exposed; and (n) removing the remaining fourth nonmagnetic material layer so as to leave the fifth nonmagnetic material layer in the regions the predetermined distance away from the sides of the primary magnetic pole. The remaining fifth nonmagnetic material layer defines the shield bank layer.

Thus, the shield bank layer can be easily provided in regions a predetermined distance away in the width direction from the sides of the primary magnetic pole.

The fourth nonmagnetic material layer may be formed of a material capable of being etched by reactive ion etching.

Such a fourth nonmagnetic material layer is easy to remove.

In this instance, the first nonmagnetic material layer and the fifth nonmagnetic material layer may be formed of at least one material selected from the group consisting of $Al_2O_3$, AlSiO, and AlSiON, and the fourth nonmagnetic material layer may be formed of at least one material selected from the group consisting of $SiO_2$, $Ta_2O_5$, Ti, W, Cr, Ta, and oxides and nitrides of Ti, W, Cr, and Ta.

The primary magnetic pole of the present invention has a flat top surface. Such a flat top surface prevents record signals from being distorted, effectively, and thus prevents the occurrence of noise during reproduction of the recorded signals.

In addition, since the shield layer can be formed in such a large size as to increase the absorption of magnetic flux, such a structure can prevent write fringing in recording media, erasure of signals recorded in the adjacent recoding tracks, and other problems.

Furthermore, by setting the distance between the side surface of the primary magnetic pole and the shield layer to be longer than the distance between the top surface of the primary magnetic pole and the shield layer, the shield layer does not excessively absorb recording flux generated from the first magnetic portion.

Since the method of the present invention includes the step of cutting the upper portion of the primary magnetic pole to flatten, the resulting perpendicular magnetic recording head can prevent record signals from being distorted, effectively, and thus prevents the occurrence of noise during reproduction of the recorded signals.

Since the method of the present invention also includes the step of forming the shield layer in a single piece, the shield layer can be formed in a large size so as to prevent write fringing in recording media, erasure of signals recorded in the adjacent recoding tracks, and other problems.

DESCRIPTION OF THE PREFERRED EMBODIMENTS

Figure 1A:
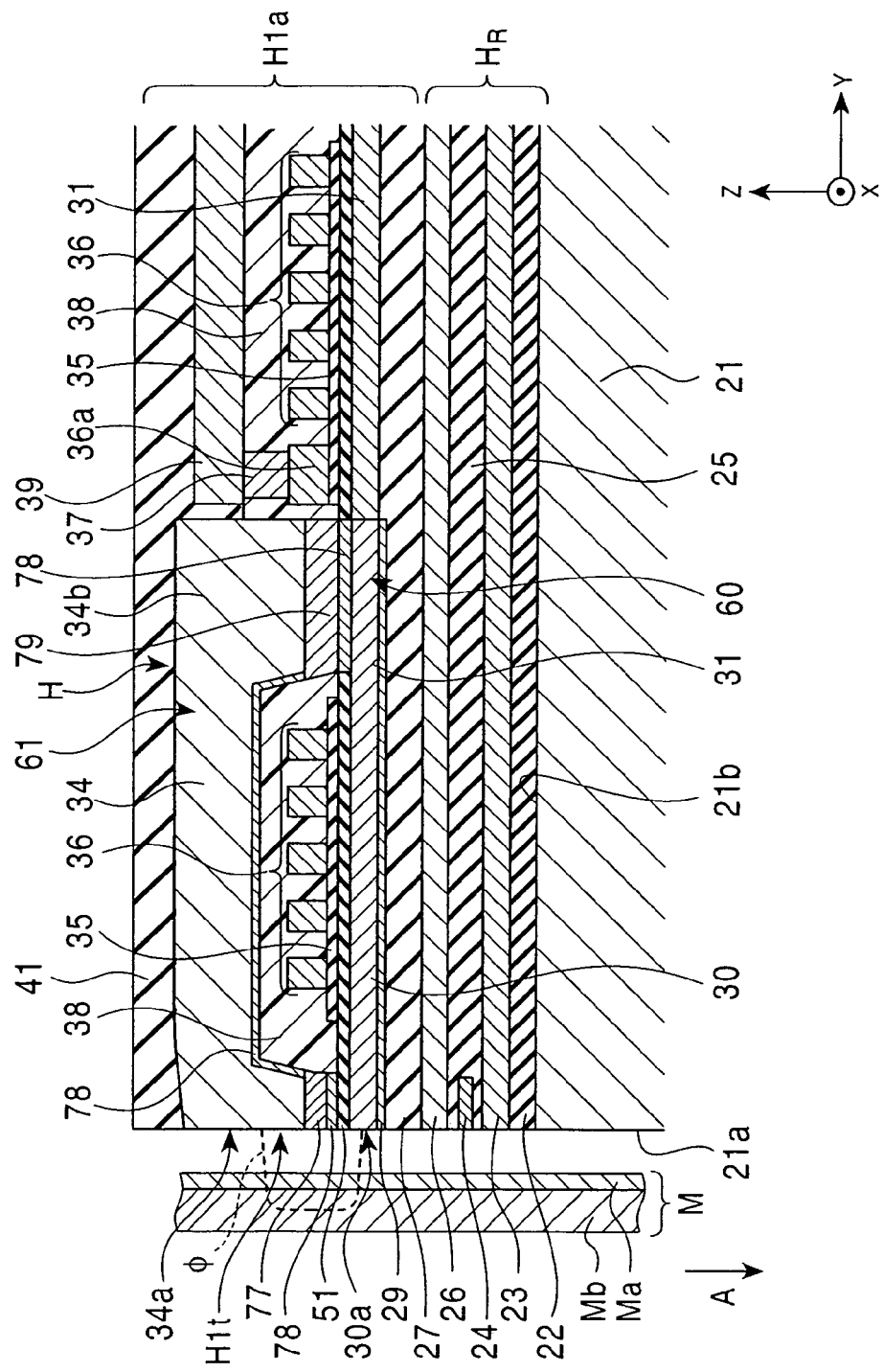
FIG. 1A is a longitudinal sectional view of a perpendicular magnetic recording head according to a first embodiment of the present invention.
Figure 2:
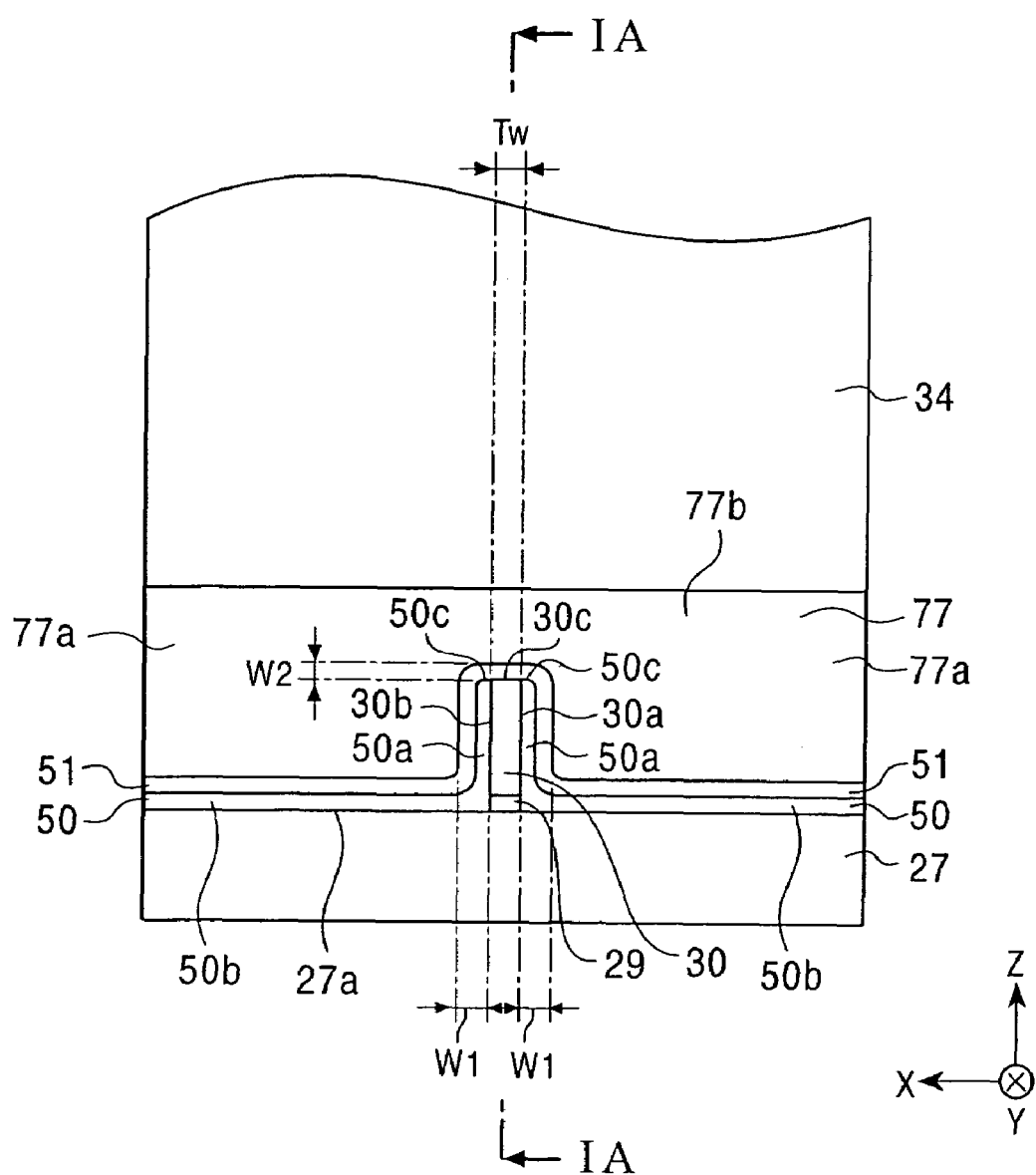
FIG. 2 is a fragmentary front view of the magnetic head shown in FIG. 1A.
Figure 3:
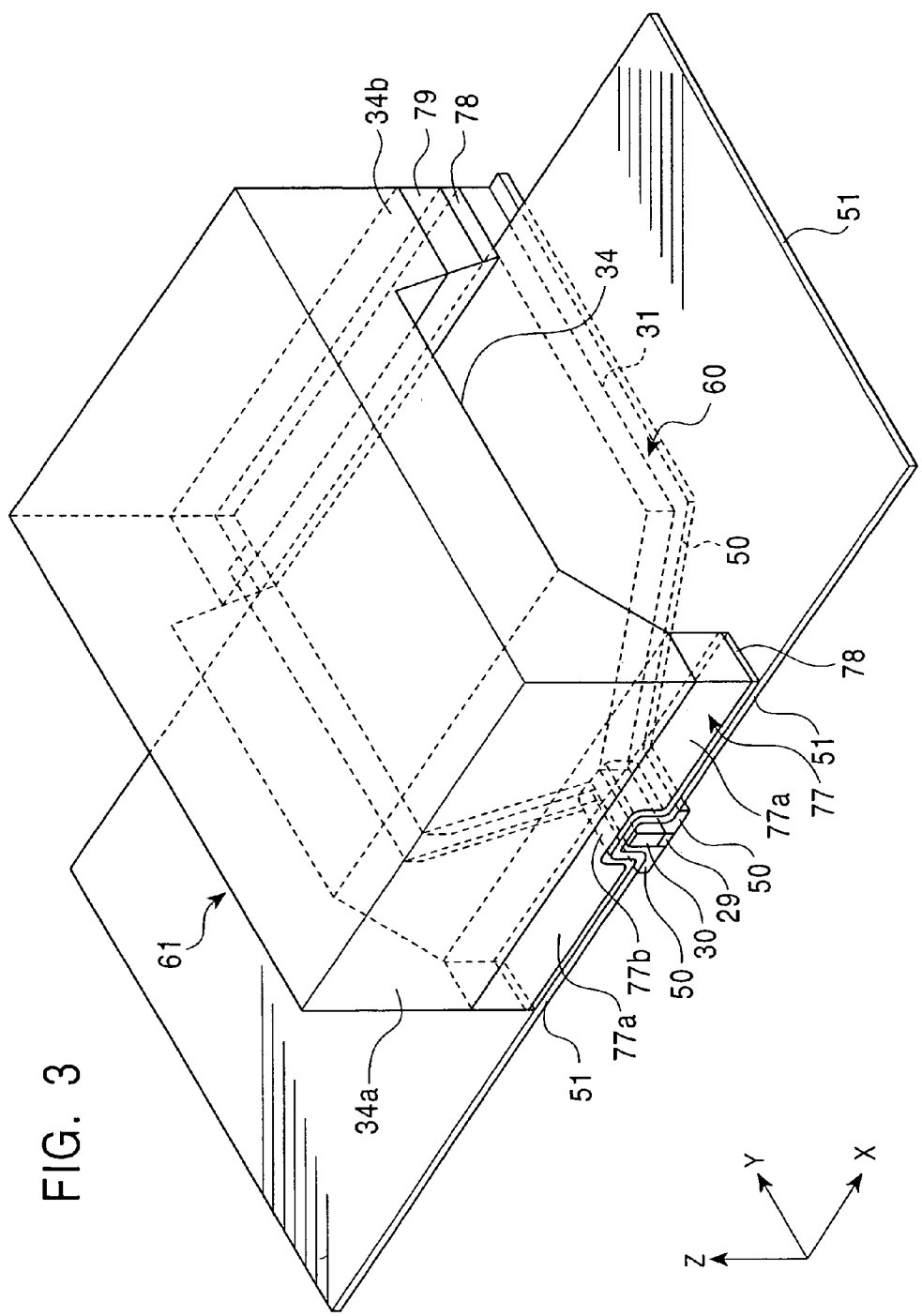
FIG. 3 is a fragmentary perspective view of the magnetic head shown in FIG. 1A.

FIG. 1A is a longitudinal sectional view of a perpendicular magnetic recording head H1a according to a first embodiment of the present invention, and FIG. 2 is a front view of the magnetic head H1a shown in FIG. 1A. The section of FIG. 1A is taken along line IA-IA of FIG. 2 and viewed from the direction indicated by the arrow. FIG. 3 is a fragmentary schematic perspective view of the perpendicular magnetic recording head H1a shown in FIG. 1A.

The perpendicular magnetic recording head H1a applies a perpendicular magnetic field to a recording medium M to magnetize a hard layer Ma of the medium M in the perpendicular direction.

The recording medium M is, for example, a disk including the hard layer Ma having high residual magnetization at its surface and a soft layer Mb having a high magnetic permeability inside. The disk rotates on its center.

A slider 21 is made of a nonmagnetic material, such as $Al_2O_3$—TiC, and its one side surface 21a opposes the recording medium M. Rotation of the recording medium M creates airflow at the medium surface and the airflow allows the slider 21 to float from and slide over the surface of the recording medium M. The slider 21 moves in the direction designated by arrow A with respect to the recording medium M.

The slider 21 is provided with a nonmagnetic insulating layer 22 made of, for example, $Al_2O_3$ or $SiO_2$, over its trailing end surface 21b. A reading portion $H_R$ is formed on the nonmagnetic insulating layer 22.

The reading portion $H_R$ includes a lower shield layer 23, an upper shield layer 26, an inorganic insulating layer (gap insulating layer) 25 between the shield layers 23 and 26, and reading element 24 inside the inorganic insulating layer 25. The reading element 24 is an AMR, a GMR, a TMR, or other magnetoresistive element.

A separation layer 27 is formed over the reading portion $H_R$, and the magnetic recording head H1a is disposed on the separation layer 27. The surface H1t of the magnetic head H1a opposing to the recording medium M is substantially flush with the medium-opposing surface 21a of the slider 21.

The reading portion $H_R$ may not be provided, and only the perpendicular magnetic recording head H1a may be disposed on the trailing end surface 21b of the slider 21.

A conductive metal, such as NiFe, is deposited to form a plating base layer 29 on the separation layer 27 by sputtering.

A primary magnetic pole 30 having a width in the track width direction (X direction in the figures) equivalent to the track width Tw is formed on the plating base layer 29, extending at a predetermined length in the height direction (Y direction in the figures) from the medium-opposing surface H1t of the magnetic head H1a, as shown in FIGS. 1A and 2. The width of the primary magnetic pole 30 or the track width is in the range of 0.05 to 1.0 μm, and more preferably 0.05 to 0.2 μm. The primary magnetic pole 30 integrally has a yoke 31 with a width larger than the track width Tw extending in the height direction from the end of the magnetic pole 30. The primary magnetic pole 30 and the yoke 31 define a first magnetic portion 60. The first magnetic portion 60 is formed of a material having a high saturation magnetic flux density, such as NiFe, CoFe, or NiFeCo, by plating.

As shown in FIG. 2, the plating base layer 29 and the primary magnetic pole layer 30 are formed so that their widths at the medium-opposing surface H1t define the track width.

A first nonmagnetic material layer 50 is formed of at least one material selected from among $Al_2O_3$, AlSiO, and AlSiON, over the side surfaces 30a and 30b of the primary magnetic pole 30 and the upper surface 27a of the separation layer 27. The first nonmagnetic material layer 50 is not present on the top surface 30c of the primary magnetic pole 30.

The first nonmagnetic material layer 50 has vertical portions 50a in contact with the side surfaces 30a and 30b of the primary magnetic pole 30 and horizontal portions 50b opposing the separation layer 27 and extending in the direction perpendicular to the vertical portions 50a. The top surface 50c of the vertical portions 50a is flush with the top surface 30c of the primary magnetic pole 30.

A second nonmagnetic material layer 51 (gap layer) is formed over the top surface 30c of the primary magnetic pole 30 and the top surface 50c, vertical portions 50a, and horizontal portions 50b of the first nonmagnetic material layer 50.

A shield layer is formed of a magnetic material, such as NiFe alloy, over the second nonmagnetic material layer 51, as shown in FIG. 2, with an underlayer 78 of a magnetic material, such as NiFe alloy, therebetween. Specifically, the shield layer 77 is disposed over the top surface 30c of the primary magnetic pole 30 and at both sides in the track width direction of the magnetic pole 30, overlying the second nonmagnetic material layer 51.

Hence, the portions of the shield layer 77 at the sides in the track width direction of the primary magnetic pole 30 define side shields 77a, and the portion above the magnetic pole 30 defines an upper shield 77b. Thus, the top and sides of the primary magnetic pole 30 are surrounded by the shield layer 77, as shown in FIG. 2, when viewed from the front.

The length in the height direction of the shield layer 77 may be substantially the same as the length in the height direction of the primary magnetic pole 30, as shown in FIG. 3, or may be larger. In the latter case, the shield layer 77 is formed so as to spread to the sides of the yoke 31.

A secondary magnetic pole 34 serving as a second magnetic portion 61 is formed of a ferromagnetic material, such as Permalloy, on the shield layer 77. The front end 34a of the secondary magnetic pole 34 is exposed at the medium-opposing surface H1t of the head H1a. The secondary magnetic pole 34 is magnetically coupled at its back (coupling portion 34b) with the first magnetic portion 60 with the underlayer 78 and a magnetic material layer 79 therebetween. The underlayer and magnetic material layer 79 are each made of a NiFe alloy or other magnetic material. The underlayer 78 and the magnetic material layer 79 define part of the secondary magnetic pole 34, thus forming a magnetic path communicating the secondary magnetic pole 34, the yoke 31, and the primary magnetic pole 30.

A coil insulating underlayer 35 is formed around the coupling portion 34b. A coil layer 36 formed of a conductive material, such as Cu, on the coil insulating underlayer 35. The coil layer 36 is patterned by frame plating or the like in a spiral manner so as to wind in a predetermined number of turns around the coupling portion 34b. The coupling end 36a on the coil center side of the coil layer 36 is provided with a bank layer 37 made of a conductive material, such as Cu.

Alternatively, the coil layer 36 may be formed in a toroidal manner with a predetermined number of turns in the thickness direction around the primary magnetic pole 30 and the yoke 31.

The coil layer 36 and the bank layer 37 are covered with a coil insulating layer 38 of an organic material, such as resist. The coil insulating layer 38 may further be covered with an inorganic insulating layer of, for example, $Al_2O_3$, which is not shown in the figure. The secondary magnetic pole 34 is disposed on the coil insulating layer 38 with the underlayer 78 made of a magnetic material, such as NiFe alloy, therebetween.

The upper surface of the bank layer 37 is exposed at the surface of the coil insulating layer 38 and joined to a lead layer 39. Recording current is applied to the bank layer 37 and the coil layer 36 through the lead layer 39.

The secondary magnetic pole 34 and the lead layer 39 are covered with a protective layer 41 made of an inorganic nonmagnetic insulating material.

As shown in FIG. 1A, the front ends 30a and 34a of the primary magnetic pole 30 and the secondary magnetic pole 34 are exposed at the medium-opposing surface H1t.

In the magnetic head H1a shown in FIG. 1A, recording current is applied to the coil layer 36 through the lead layer 39, so that a current magnetic field in the coil layer 36 induces a recording magnetic field to the secondary magnetic pole 34, the yoke 35, and the primary magnetic pole 30. A leakage recording magnetic field from the front ends 30a and 34a of the primary magnetic pole 30 and the secondary magnetic pole 34 passes through the hard layer Ma and soft layer Mb of the recording medium M in the vicinity of the medium-opposing surface H1t, as shown in FIG. 1A. In this instance, flux φ of the leakage recording magnetic field is concentrated on the front end 30a of the primary magnetic pole 30, thereby magnetizing the hard layer Ma in the perpendicular direction to record magnetic data.

The characteristic features of the perpendicular magnetic recording head H1a of the present invention will now be described.

In the perpendicular magnetic recording head H1a shown in FIGS. 1A, 2, and 3, the top surface 30c of the primary magnetic pole 30 is formed flat.

If the top surface 30c of the primary magnetic pole 30 is not flat and is formed in curved manner or convex shape, magnetic data or record signals are distorted and recorded inaccurately. Consequently, noise occurs during reproduction of the recorded signals. On the other hand, in the perpendicular magnetic recording head H1a, the primary magnetic pole 30 has the flat top surface 30c. Since such a flat top surface allows accurate recording of signals onto a recording medium and prevents record signals from being distorted, effectively, it can prevent the occurrence of noise during reproduction of the recorded signals.

The primary magnetic pole 30 is covered with the shield layer 77, in three directions from the top surface to the sides. Hence the shield layer 77 is disposed not only at the sides of the primary magnetic pole 30 but also over the top surface, thus integrally including the side shield portions 77a and the upper shield portion 77b. Accordingly, the entire size of the shield layer 77 can be large to increase the absorption of magnetic flux. Thus, if recording flux generated from the primary magnetic pole 30 for writing spreads to the sides of the primary magnetic pole 30, the spread flux (side flux) can be easily absorbed. The side flux becomes easily absorbed into the shield layer 77 before reaching a recording medium M. Thus, signals based on the side flux are not recorded onto the recording medium M, and such a structure can prevent write fringing in recording media, erasure of signals recorded in the adjacent recoding tracks, and other problems.

However, if the distance between the primary magnetic pole 30 and the side shield portion 77a of the shield layer 77 is excessively short, magnetic flux required for writing onto a recording medium M is also absorbed to degrade recording efficiency. Accordingly, it is preferable in the perpendicular magnetic recording head H1a that the distances W1 between the side surfaces 30a and 30b of the primary magnetic pole 30 and the side shield portion 77a of the shield layer 77 is longer than the distance W2 between the top surface 30c of the primary magnetic pole 30 and the upper shield portion 77b of the shield layer 77.

The side surfaces 30a and 30b of the primary magnetic pole 30 and the shield layer 77 is separated by the first nonmagnetic material layer 50 and the second nonmagnetic material layer 51, as shown in FIG. 2. On the other hand, the top surface 30c of the primary magnetic pole 30 and the shield layer 77 are separated by only one layer, the second nonmagnetic material layer 51. Thus, W1 is set longer than W2 to prevent the shield layer 77 from excessively absorbing recording flux generated from the primary magnetic pole 30, thus preventing the recording efficiency from decreasing.

Figure 1B:
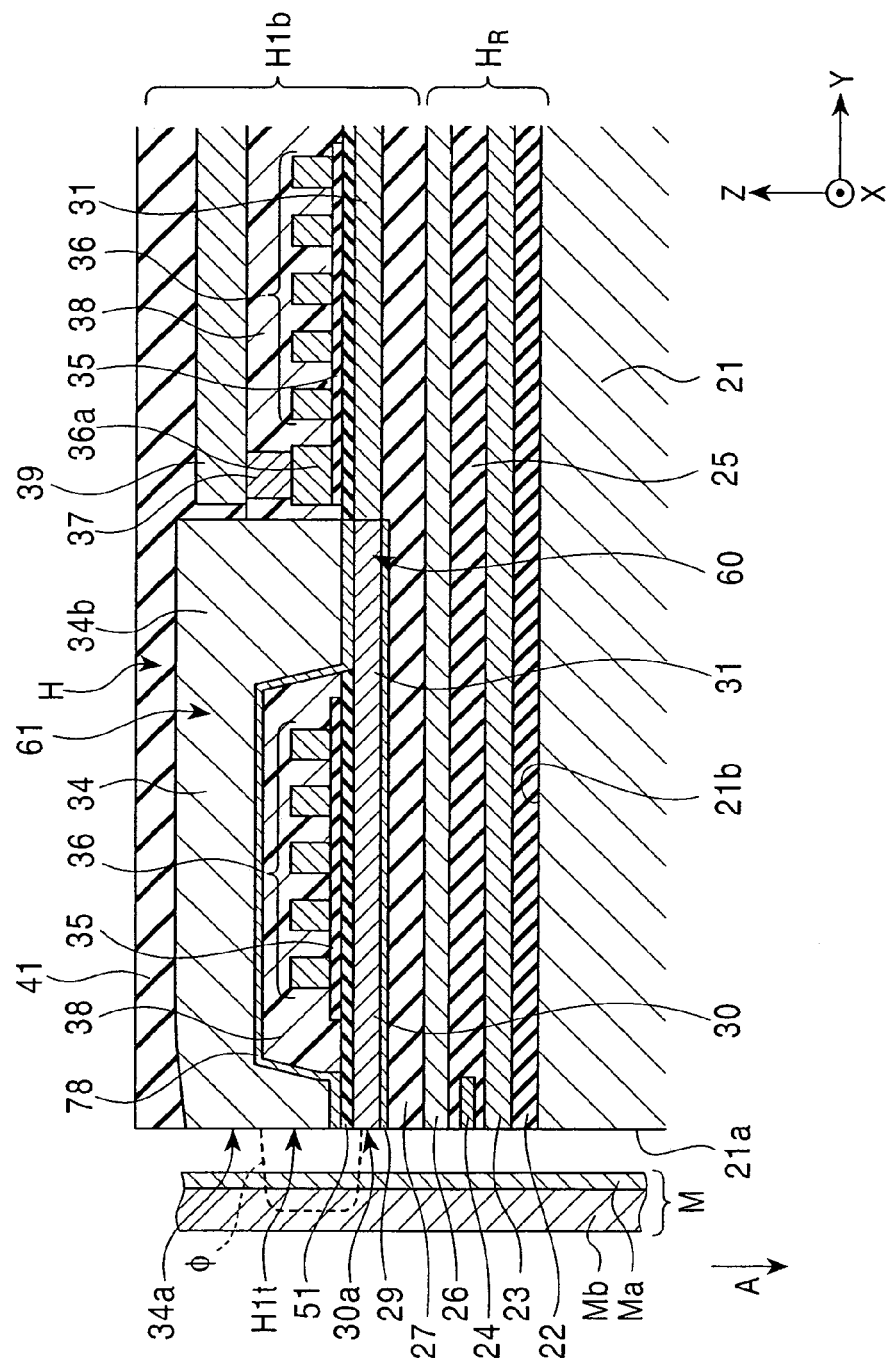
FIG. 1B is a longitudinal sectional view of a perpendicular magnetic recording head according to a modification of the first embodiment.

FIG. 1B is a longitudinal sectional view of another perpendicular magnetic recording head H1b according to the first embodiment of the present invention, and corresponds to FIG. 1A. The perpendicular magnetic recording head H1b shown in FIG. 1B has substantially the same structure as the perpendicular magnetic recording head H1a shown in FIG. 1A. The same parts of the magnetic head H1b as in FIG. 1A are designated the same reference numerals.

The perpendicular magnetic recording head H1b is different from the perpendicular magnetic recording head H1a shown in FIG. 1A in that it does not have the magnetic material layer 79 and the secondary magnetic pole 34 and the shield layer 77 are formed in a single piece directly over the underlayer 78.

This structure also produces the same effect as the perpendicular magnetic recording head H1a shown in FIG. 1A.

Figure 4:
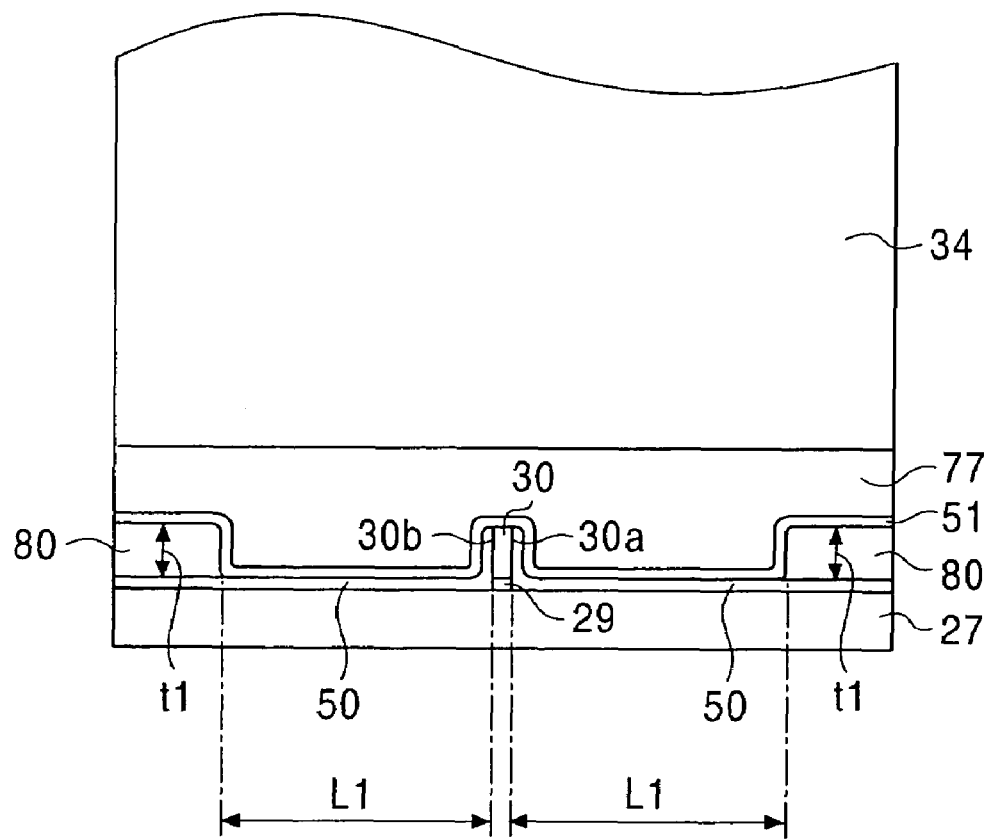
FIG. 4 is a front view of a perpendicular magnetic recording head according to a second embodiment of the present invention.

FIG. 4 is a front view of a perpendicular magnetic recording head H2 according to a second embodiment of the present invention, and corresponds to FIG. 2.

The same reference numerals as in the perpendicular magnetic recording head H1a shown in FIG. 2 designate the same parts.

The perpendicular magnetic recording head H2 shown in FIG. 4 has a shield bank layer 80 made of a nonmagnetic material with a predetermined distance L1 from the side surface of the primary magnetic pole 30 on the first nonmagnetic material layer 50. The shield bank layer 80 is made of at least one inorganic insulating material selected from among $Al_2O_3$, AlSiO, and AlSiON. Accordingly, the distance between the shield layer 77 or the secondary magnetic pole 34 and the upper shield layer 26 of the reading portion $H_R$ is increased by the thickness t1 of the shield bank layer 80. Thus, the insulation between the shield layer 77 or the secondary magnetic pole layer 34 and the upper shield layer 26 of the reading portion $H_R$ can be enhanced. Hence, the shield bank layer 80 is disposed only in regions where high insulation is required, but not in regions where high insulation is not necessary, to enhance the insulation in such desired regions.

In addition, since the shield bank layer 80 reduces the size of shield layer 77 by its size, the leakage of magnetic flux in the perpendicular magnetic recording head H2 can be prevented. Consequently, deterioration of the recording ability can be prevented. Furthermore, the shield bank layer 80 can disperse the flux concentrated on the ends (not shown in the figure) of the shield layer 77.

While the primary magnetic pole 30 is disposed under the secondary magnetic pole 34 (in the direction opposite to the Z direction) in the above-described perpendicular magnetic recording heads H1a, H1b, and H2, shown in FIGS. 1A to 4, the present invention is not limited to such a structure. For example, the primary magnetic pole 30 may be disposed above the secondary magnetic pole 34 (in the Z direction).

A method for manufacturing the perpendicular magnetic recording head H1a shown in FIGS. 1A, 2, and 3 will now be described.

FIGS. 5A to 14B each show a step of the method for manufacturing the perpendicular magnetic recording head H1a. The figures marked with a letter A are fragmentary front views from the medium-opposing surface H1t; the figures marked with a letter B, fragmentary longitudinal sectional view; the figures marked with a letter C are fragmentary plan views.

The following description omits the process for forming layers under the separation layer 27 (in the direction opposite to the Z direction) and illustrates the process for forming the layers from the separation layer 27 to the shield layer 77. Also, in the fragmentary front views of FIGS. 5A to 14B, marked with the letter A, the first magnetic portion 60 is shown by only the primary magnetic pole 30 without the yoke 31, for ease of comprehension.

Figure 5A:
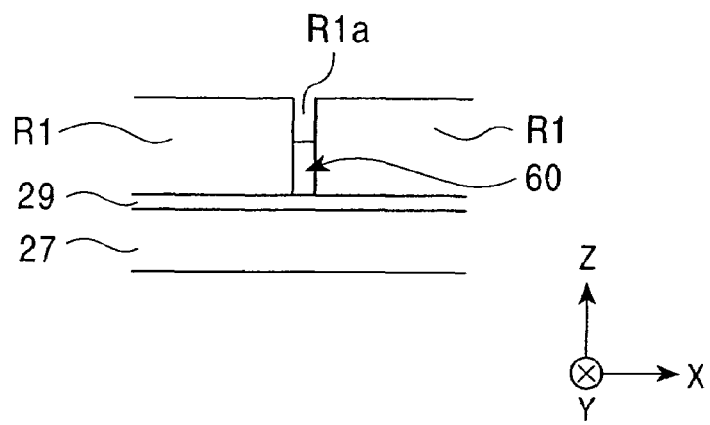
FIG. 5A is a fragmentary front view of a step of a process for manufacturing the perpendicular magnetic recording head shown in FIG. 1A viewed from the surface opposing a recording medium.
Figure 5B:
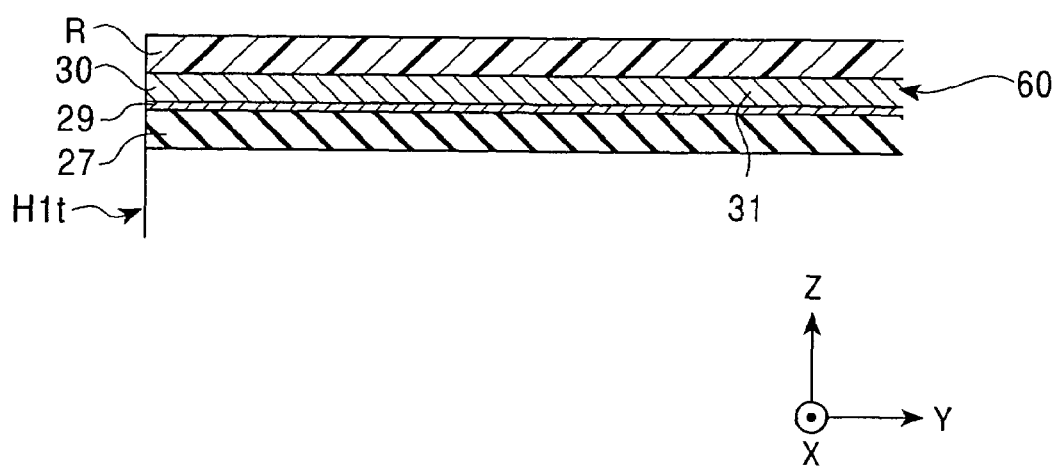
FIG. 5B is a fragmentary longitudinal sectional view of a step of the process for manufacturing the perpendicular magnetic recording head shown in FIG. 1A viewed from a side perpendicular to the surface opposing a recording medium.

First, the plating base layer 29 is formed of a magnetic material, such as NiFe, over the separation layer 27 made of an inorganic material, such as $Al_2O_3$ or $SiO_2$, as shown in FIGS. 5A and 5B.

Then, a resist layer R1 is formed over the plating base layer 29, and is patterned by exposure and development to form a recess R1a having a shape of the first magnetic portion 60, which is defined by the primary magnetic pole 30 and the yoke 31 as shown in FIG. 1A.

The first magnetic portion 60 is formed in the recess R1a by plating, using the plating base layer 29 as an electrode. For the first magnetic portion 60, a material having high saturation magnetic flux density is used, such as NiFe, CoFe, or NiFeCo.

Figure 6A:
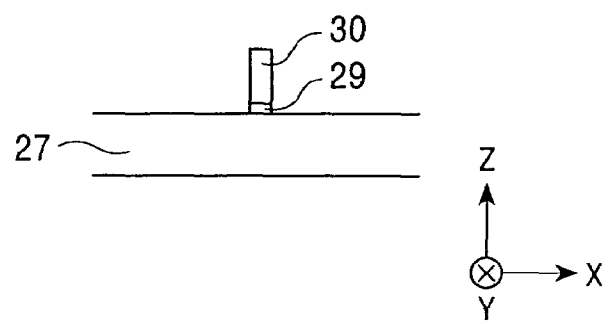
FIG. 6A is a fragmentary front view of the step following the step shown in FIG. 5A.
Figure 6B:
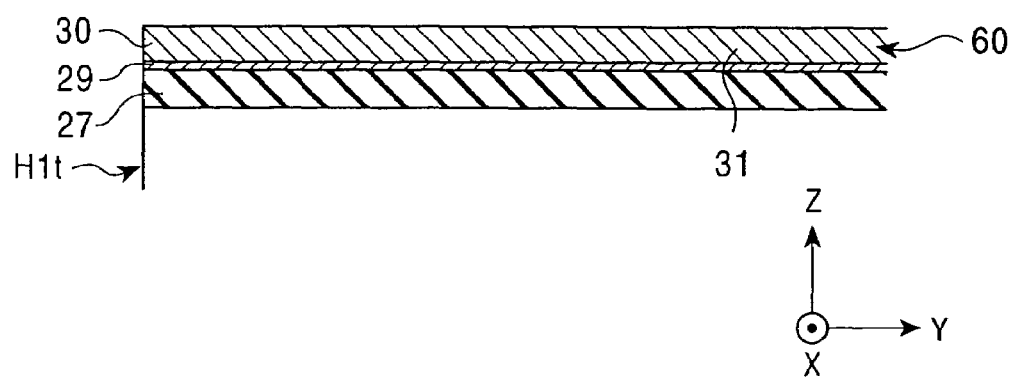
FIG. 6B is a fragmentary longitudinal sectional view of the step following the step shown in FIG. 5B.

Turning to FIGS. 6A and 6B, after removing the resist layer R1, the plating base layer 29 exposed around the first magnetic portion 60 is removed by ion milling or the like. At the same time, the primary magnetic pole 30 may be cut in the track width direction to adjust the width in the track width direction by ion milling.

Figure 7A:
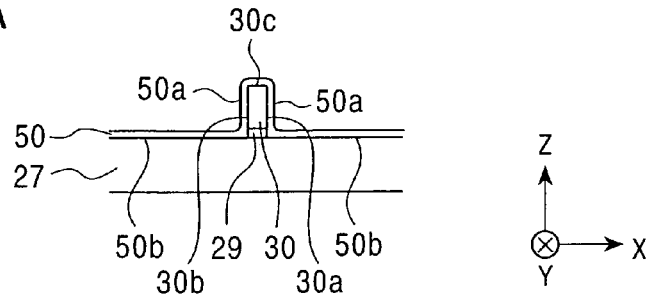
FIG. 7A is a fragmentary front view of the step following the step shown in FIG. 6A.
Figure 7B:
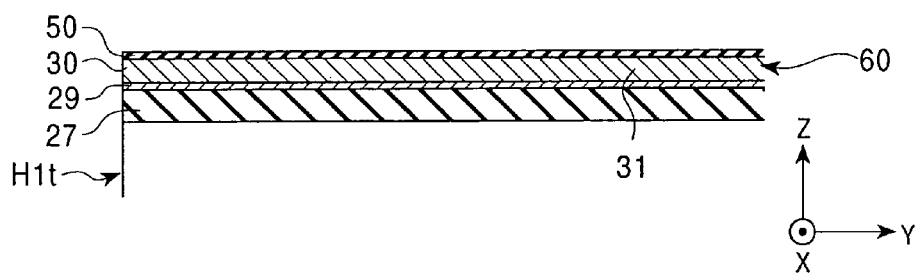
FIG. 7B is a fragmentary longitudinal sectional view of the step following the step shown in FIG. 6B.
Figure 7C:
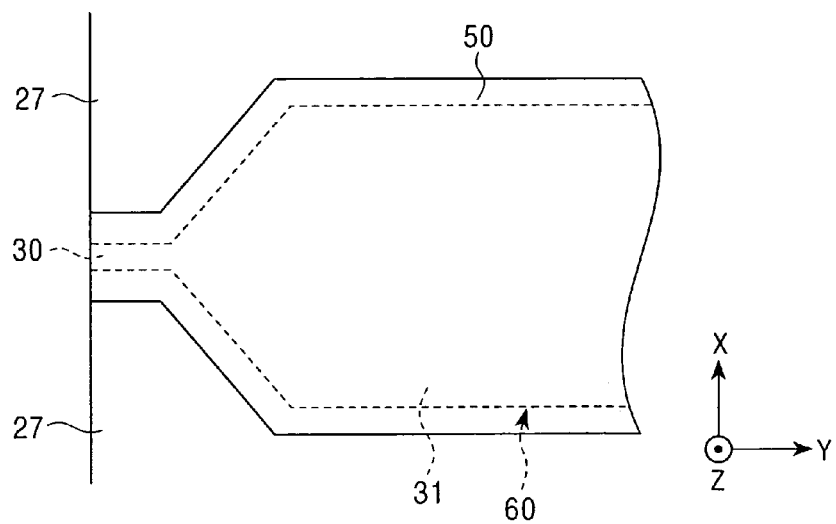
FIG. 7C is a fragmentary plan view of the step following the step shown in FIGS. 6A and B.

Turning to FIGS. 7A, 7B, and 7C, a first nonmagnetic material layer 50 is formed over the top surface 30c and the side surfaces 30a and 30b of the primary magnetic pole 30 and the upper surface 27a of the separation layer 27. In this instance, the first nonmagnetic material layer 50 has vertical portions 50a in contact with the side surfaces 30a and 30b and horizontal portions 50b opposing the separation layer 27 and extending in the direction perpendicular to the vertical portions 50a. For the first nonmagnetic material layer 50, a material hard to remove by reactive etching (RIE) (described later with reference to FIG. 10A) of a third nonmagnetic material layer 70 is used. For example, at least one selected from among $Al_2O_3$, AlSiO, and AlSiON is used.

Figure 8A:
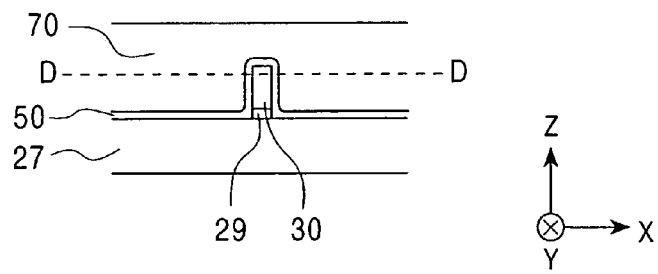
FIG. 8A is a fragmentary front view of the step following the step shown in FIG. 7A.
Figure 8B:
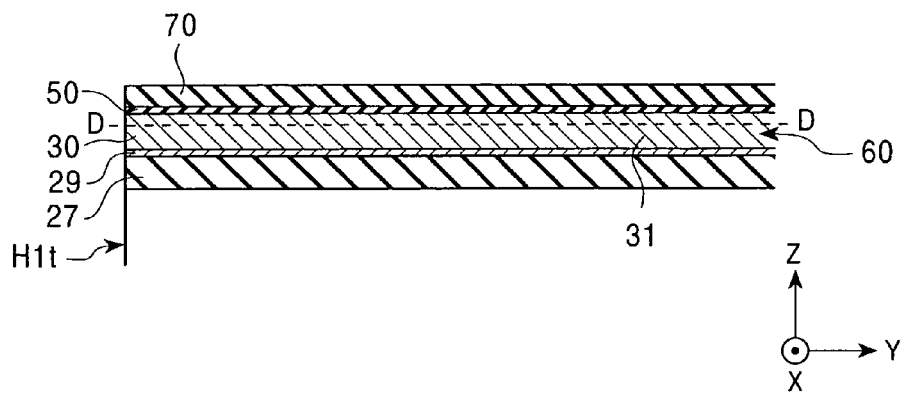
FIG. 8B is a fragmentary longitudinal sectional view of the step following the step shown in FIG. 7B.
Figure 8C:
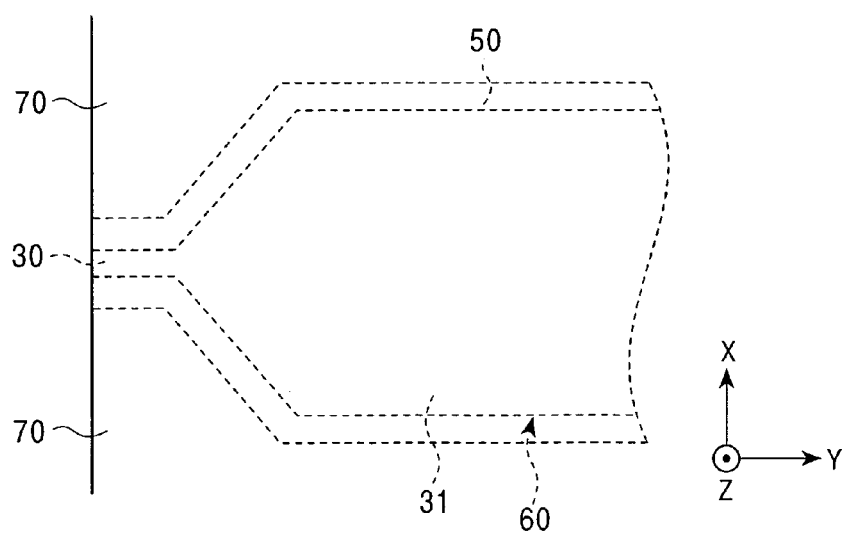
FIG. 8C is a fragmentary plan view of the step following the step shown in FIG. 7C.
Figure 9A:
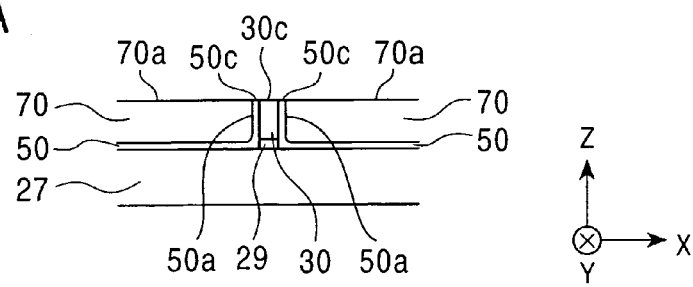
FIG. 9A is a fragmentary front view of the step following the step shown in FIG. 8A.
Figure 9B:
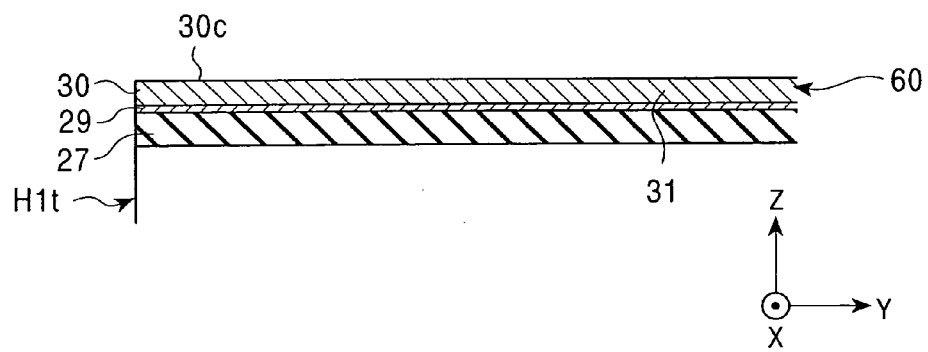
FIG. 9B is a fragmentary longitudinal sectional view of the step following the step shown in FIG. 8B.
Figure 9C:
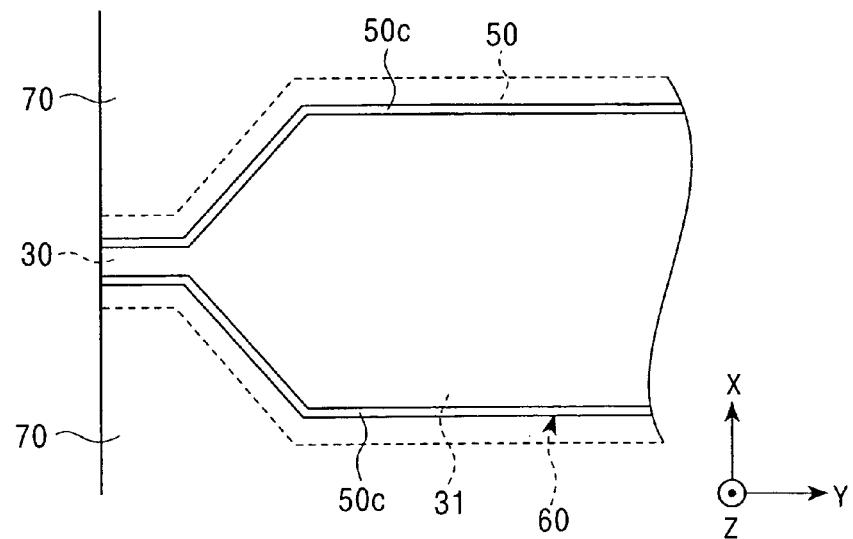
FIG. 9C is a fragmentary plan view of the step following the step shown in FIG. 8C.

The third nonmagnetic material layer 70 is formed over the first nonmagnetic material layer 50 and the upper surface of the separation layer 27, as shown in FIGS. 8A, 8B, and 8C. For the third nonmagnetic material layer, a material capable of being removed by RIE is used. Such materials include $SiO_2$, $Ta_2O_5$, Ti, W, Cr, Ta, and oxides and nitrides of Ti, W, Cr, and Ta. These materials may be used singly or in combination. As shown in FIG. 8A, the third nonmagnetic material layer 70 is disposed at the sides of the primary magnetic pole 30 and the first nonmagnetic material layer 50 covering the primary magnetic pole 30. Preferably, the third nonmagnetic material layer is formed high beyond the height of the primary magnetic pole 30 so as to cover the primary magnetic pole 30 from three directions of the top and sides of the magnetic pole 30, in order to prevent the primary magnetic pole 30 from breaking. Then, the third nonmagnetic material layer 70 is cut along line D-D in FIG. 8B by chemical mechanical polishing (CMP).

When the third nonmagnetic material layer 70 is cut along line D-D, part of the vertical portion 50a of the first nonmagnetic material layer 50 and the upper region of the primary magnetic pole 30 are removed together. Consequently, the upper surface 70a of the third nonmagnetic material layer 70, the top surface 50c of the vertical portion 50a of the first nonmagnetic material layer 50, and the top surface 30c of the primary magnetic pole 30 are flush with each other. Thus, the top surface 30c of the primary magnetic pole 30 is flattened. If the third nonmagnetic material layer 70 is not provided and flattening is performed by cutting only the primary magnetic pole 30 and first nonmagnetic material layer 50, the primary magnetic pole 30 is liable to break due to external forth by CMP because the width in the track width direction of the primary magnetic pole 30 is as small as, for example, 0.05 to 1.0 μm or, more preferably, 0.05 to 0.2 μm. On the other hand, in the present invention, the presence of the third nonmagnetic material layer 70 provided at the sides of the primary magnetic pole 30 prevents the breakage of the primary magnetic pole 30. In addition, the third nonmagnetic material layer 70 formed high beyond the height of the primary magnetic pole 30 can entirely cover the primary magnetic pole 30 to prevent the primary magnetic pole 30 from being damaged by CMP.

Figure 10A:
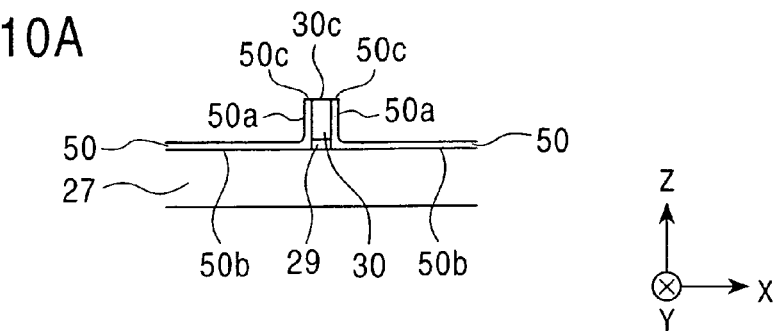
FIG. 10A is a fragmentary front view of the step following the step shown in FIG. 9A.
Figure 10B:
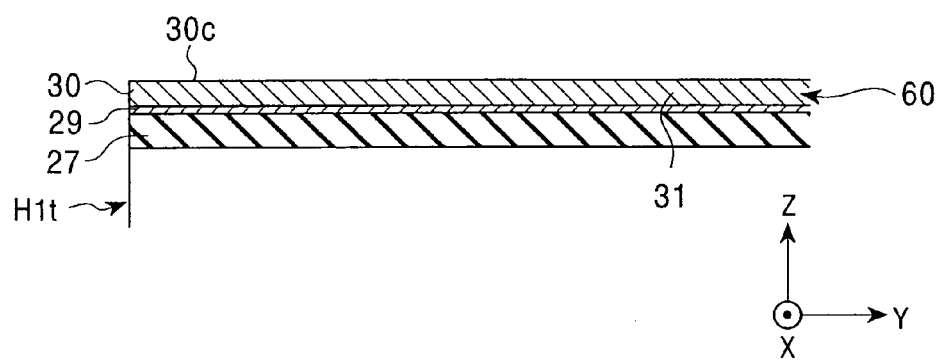
FIG. 10B is a fragmentary longitudinal sectional view of the step following the step shown in FIG. 9B.
Figure 10C:
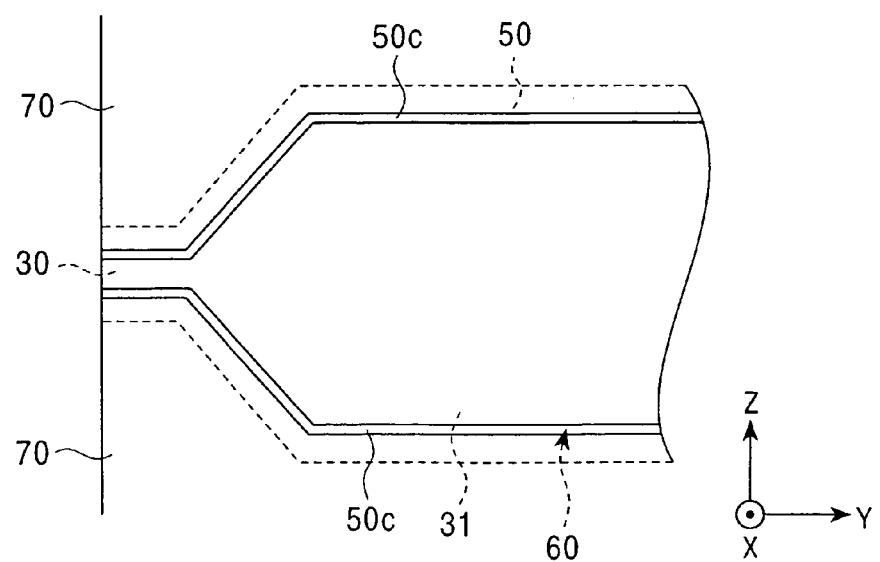
FIG. 10C is a fragmentary plan view of the step following the step shown in FIG. 9C.

Turning to FIGS. 10A, 10B, and 10C, the third nonmagnetic material layer 70 is removed by RIE. Since the first nonmagnetic material layer 50 is made of a material hard to remove by RIE, it is left without being removed.

Figure 11A:
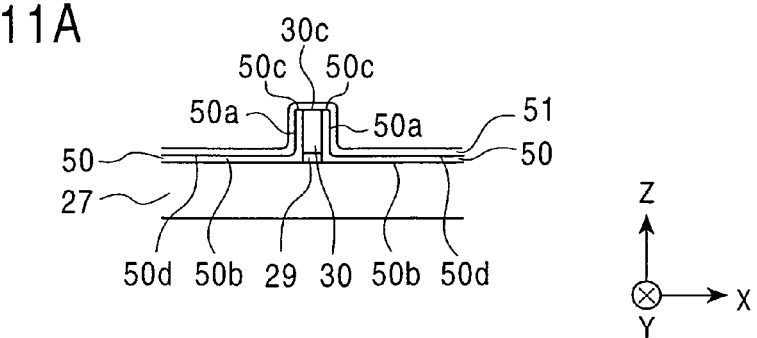
FIG. 11A is a fragmentary front view of the step following the step shown in FIG. 10A.
Figure 11B:
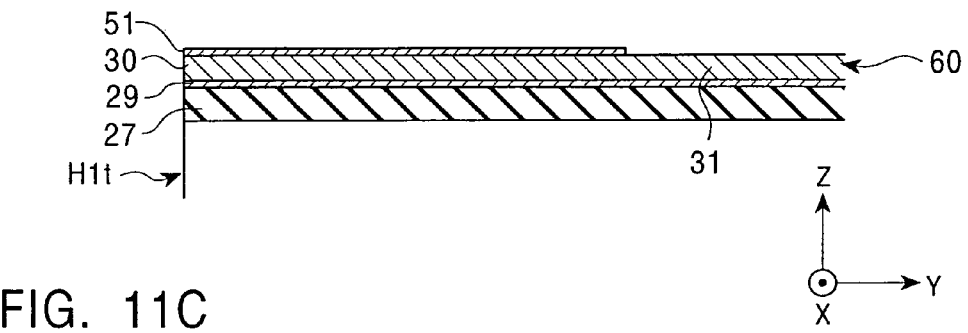
FIG. 11B is a fragmentary longitudinal sectional view of the step following the step shown in FIG. 10B.
Figure 11C:
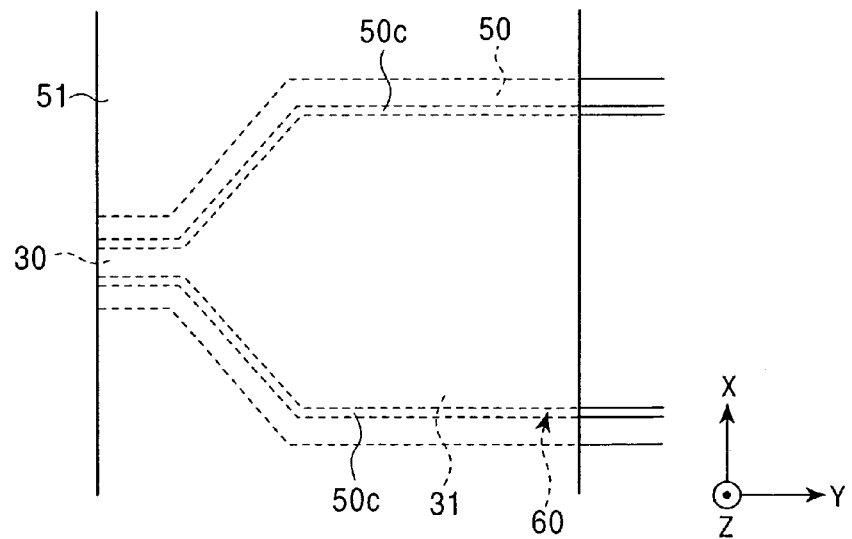
FIG. 11C is a fragmentary plan view of the step following the step shown in FIG. 10C.

Turning to FIGS. 11A, 11B, and 11C, a second nonmagnetic material layer 51 (gap layer) is formed of an inorganic material, such as $Al_2O_3$ or $SiO_2$, over the surfaces exposed by removing the third nonmagnetic material layer 70, that is, over the top surface 30c of the primary magnetic pole layer 30 and the top surface 50c, vertical portions 50a, and horizontal portions 50b of the first nonmagnetic material layer 50.

Figure 12A:
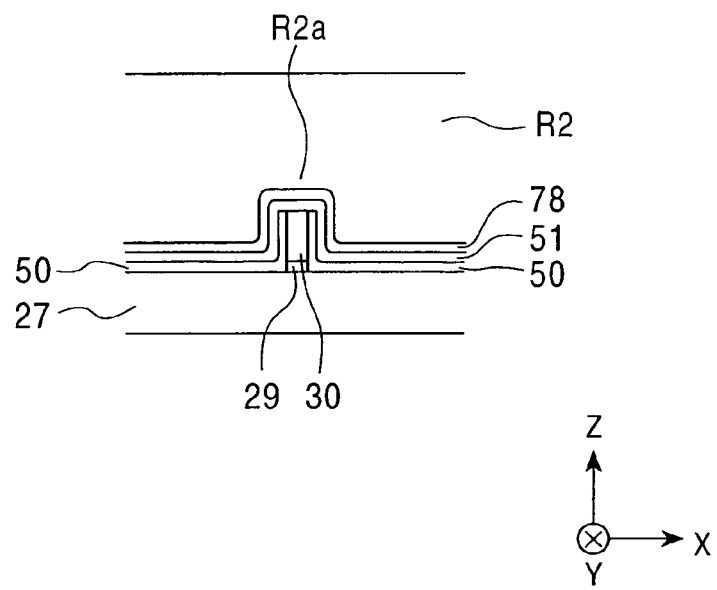
FIG. 12A is a fragmentary front view of the step following the step shown in FIG. 11A.
Figure 12B:
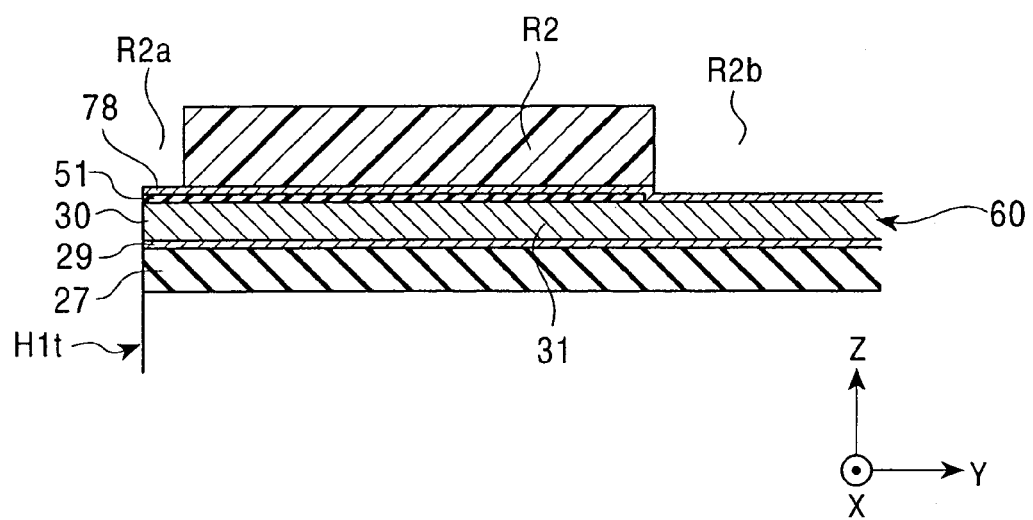
FIG. 12B is a fragmentary longitudinal sectional view of the step following the step shown in FIG. 11B.

After a magnetic material, such as a NiFe alloy, is deposited to form the underlayer 78, a resist layer R2 is formed over the underlayer 78. The resist layer R2 is patterned by exposure and development to form a recess R2a having a shape shown in FIG. 3 of the shield layer 77 and a recess R2b for forming part of the secondary magnetic pole 34 serving as the second magnetic portion 61, as shown in FIGS. 12A and 12B.

Figure 13A:
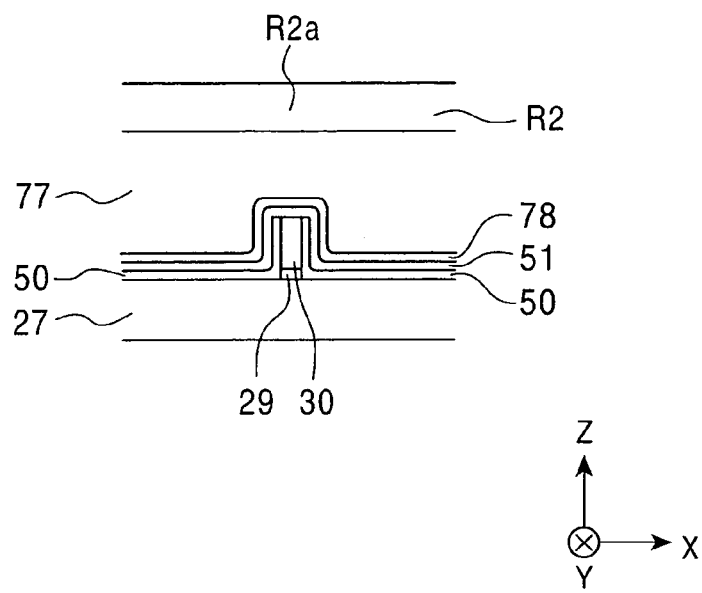
FIG. 13A is a fragmentary front view of the step following the step shown in FIG. 12A.
Figure 13B:
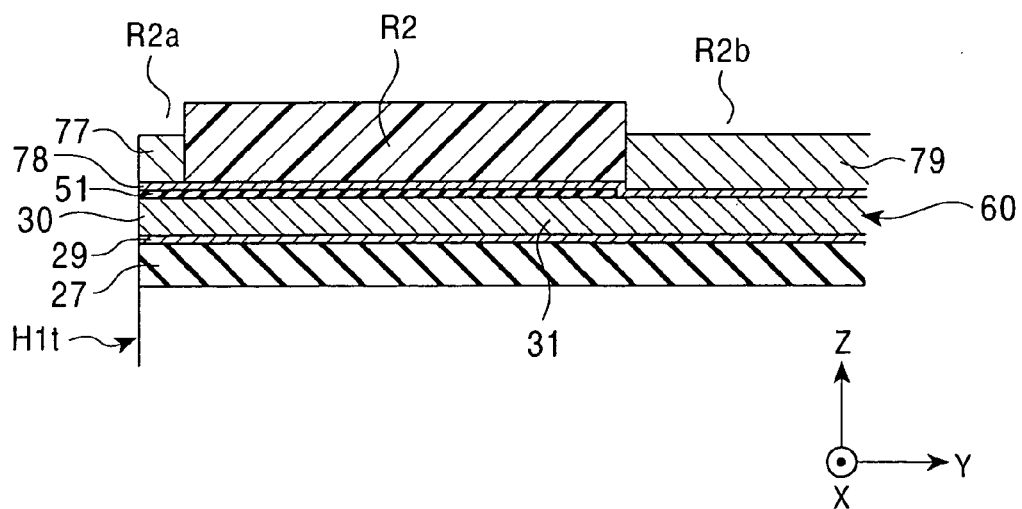
FIG. 13B is a fragmentary longitudinal sectional view of the step following the step shown in FIG. 12B.

Turning to FIGS. 13A and 13B, the shield layer 77 is formed of a magnetic material, such as a NiFe alloy, above the second nonmagnetic material layer 51 in the recess R2a by plating. At the same time, the magnetic material layer 79 is formed of, for example, a NiFe alloy 79, in the other recess R2b.

Figure 14A:
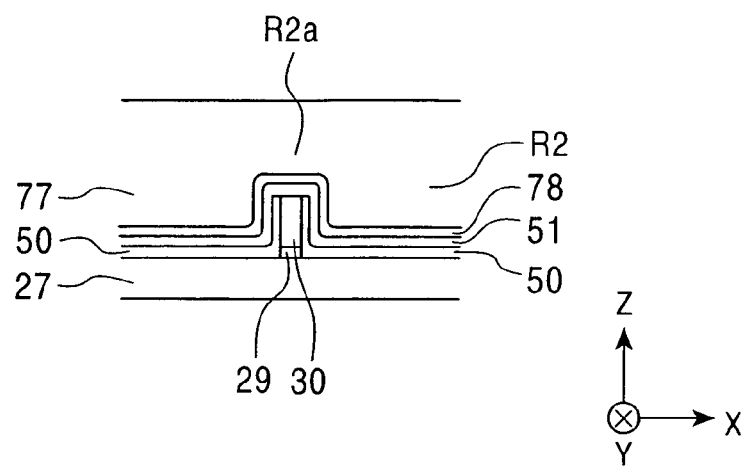
FIG. 14A is a fragmentary front view of the step following the step shown in FIG. 13A.
Figure 14B:
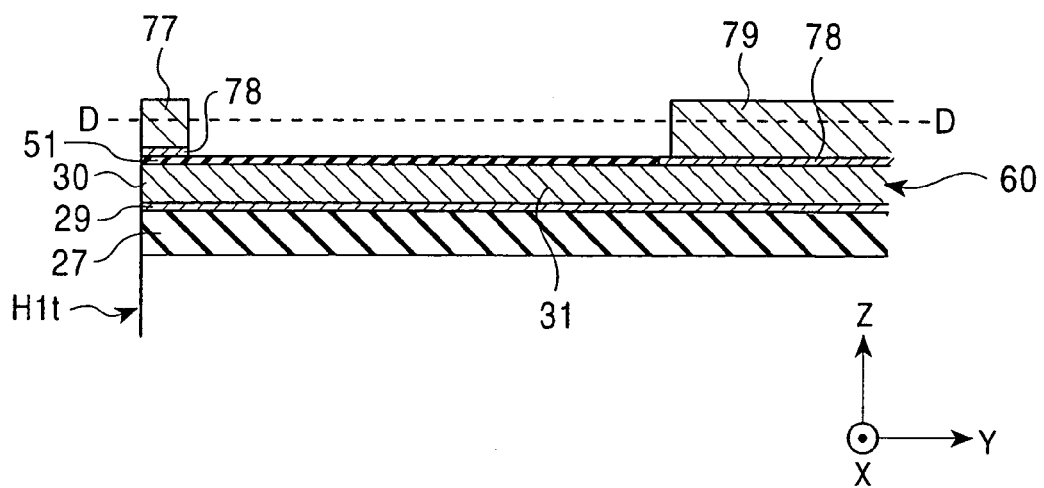
FIG. 14B is a fragmentary longitudinal sectional view of the step following the step shown in FIG. 13B.

Turning to FIGS. 14A and 14B, after removing the resist layer R2, the underlayer 78 is removed except for the portions underlying the shield layer 77 and magnetic material layer 79. Then, an inorganic material layer (not shown in the figures) is formed of, for example, $Al_2O_3$ over the shield layer 77, the second nonmagnetic material layer 51, and the magnetic material layer 79. The shield layer 77 and the magnetic material layer 79 are cut along line D-D to flatten their upper surfaces, and subsequently the inorganic material layer is removed.

In the state shown in FIGS. 14A and 14B, the portions of the shield layer 77 at the sides in the track width direction of the primary magnetic pole 30 define the side shields 77a, and the portion above the magnetic pole 30 defines the upper shield 77b. Thus, the top and sides of the primary magnetic pole 30 is formed so as to be surrounded by the shield layer 77, as shown in FIG. 2, when viewed from the front.

After the step shown in FIGS. 14A and 14B, the coil insulating underlayer 35, the coil layer 36, and the coil insulating layer 38 are formed by a known method, and the underlayer 78 is additionally formed of a magnetic material, such as a NiFe alloy over the coil insulating layer 38 from the upper surface to the side surfaces by plating. Then, the second magnetic pole 34 serving as the second magnetic portion 61 and the protective layer 41 are formed over the underlayer 78, the shield layer 77, and the magnetic material layer 79 by a known method. Thus, the perpendicular magnetic recording head H1a is completed. The materials of the third insulating material layer 33, the coil insulating underlayer 35, the coil layer 36, the coil insulating layer 38, the secondary magnetic pole 34, and the protective layer 41 have been described with reference to FIGS. 1A to 3, and the description is omitted here.

The coil layer may be formed in a toroidal manner with a predetermined number of turns in the thickness direction around the primary magnetic pole 30 and the yoke 31.

For manufacturing the perpendicular magnetic recording head H1b shown in FIG. 1B, the step shown in FIGS. 12A and 12B and its subsequent steps are performed as follows.

Figure 15:
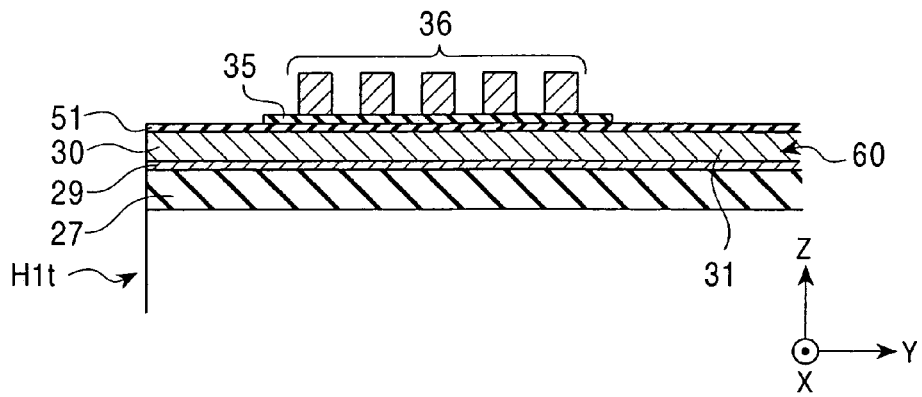
FIG. 15 is a representation of a step of a process for manufacturing the perpendicular magnetic recording head shown in FIG. 1B.

The coil insulating underlayer 35 is formed on the second nonmagnetic material layer 51 formed in the step shown in FIG. 11A, and subsequently the coil layer 36 is formed on the coil insulating underlayer 35, as shown in FIG. 15.

Figure 16:
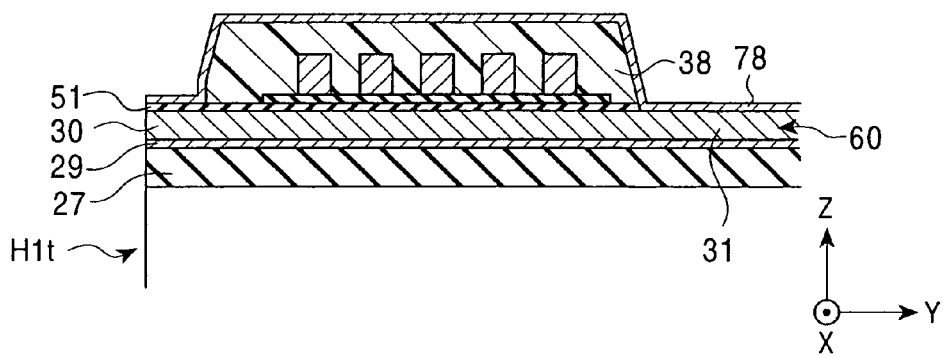
FIG. 16 is a representation of the step following the step shown in FIG. 15.

Then, the coil insulating layer 38 is formed over the second nonmagnetic material layer 51, the coil insulating underlayer 35, and the coil layer 36, as shown in FIG. 16. Furthermore, the underlayer 78 is additionally deposited over the second nonmagnetic material layer 51 in front of the coil insulating layer 38 in the height direction (Y direction in the figure), the coil insulating layer 38, and the yoke 31 at the back of the coil insulating layer 38 by plating a magnetic material, such as NiFe alloy.

Figure 17:
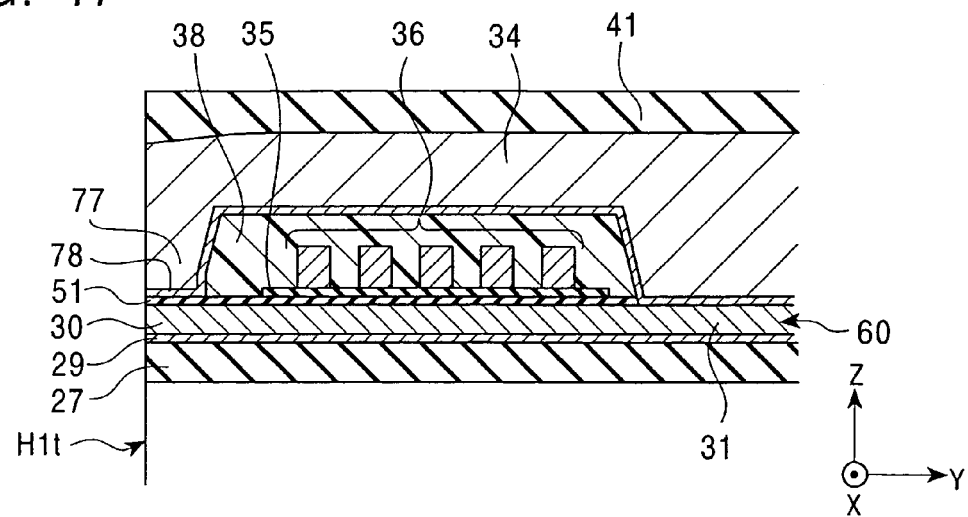
FIG. 17 is a representation of the step following the step shown in FIG. 16.

Turning to FIG. 17, the secondary magnetic pole 34 is formed over the underlayer 78. In this instance, the secondary magnetic pole 34 is integrally formed so that part of the secondary magnetic pole 34 doubles as the shield layer 77. The secondary magnetic pole 34 is covered with the protective layer 41.

Specifically, the method for manufacturing the magnetic head H1b is different from the method shown in FIGS. 5A to 14B in that the secondary magnetic pole 34 and the shield layer 77 are simultaneously formed in a single piece after the coil insulating underlayer 35, the coil layer 36, and the coil insulating layer 38 are provided.

The method for manufacturing the perpendicular magnetic recording head H1a shown in FIGS. 5A to 14B includes the step shown in FIGS. 8A, 8B, and 8C of cutting the top surface 30c of the primary magnetic pole 30 to flatten; hence, the primary magnetic pole 30 of the resulting perpendicular magnetic recording head H1a has a flat top surface 30c. Consequently, record signals are prevented effectively from being distorted, and accordingly noise does not occur during reproduction of the recorded signals.

The method also includes the step shown in FIGS. 10A, 10B, 10C of removing the third nonmagnetic material layer 70 formed in the step shown in FIGS. 8A, 8B, and 8C. Thus, a space for forming the shield layer 77 can be easily and precisely ensured at the sides of the primary magnetic pole 30.

The method also includes the step shown in FIGS. 13A and 13B of integrally forming the shield layer 77 over the second nonmagnetic material layer 51 and the primary magnetic pole 30 from the top to the sides. Thus, the side shield portions 77a and the upper side shield portion 77b are integrally provided in the shield layer 77. Accordingly, the shield layer 77 can be formed in such a large size as to absorb flux (side flux) spread to the sides of the first magnetic portion easily. Consequently, the shield layer 77 can absorb side flux before the side flux reaches a recording medium, so that signals based on the side flux are not recorded onto the recording medium M. Thus, such a structure can prevent write fringing in recording media, erasure of signals recorded in the adjacent recoding tracks, and other problems.

Hence, the method shown in FIGS. 5A to 14B simultaneously achieves the flattening of the top surface 30c of the primary magnetic pole 30 and the formation of the side shield portions 77a and the upper shield portion 77b in a single piece.

However, if the distance between the primary magnetic pole 30 and the side shield portion of the shield layer 77 is excessively short, magnetic flux required for writing onto a recording medium M is also absorbed by the shield layer 77 to degrade recording efficiency.

Accordingly, the method shown in FIGS. 5A to 14B further includes the step shown in FIGS. 11A to 11C of providing the second nonmagnetic material layer 51 over the primary magnetic pole 30 from the top surface to the sides, after the step shown in FIGS. 8A to 8C of cutting the first nonmagnetic material layer 50 together with the primary magnetic pole 30 so as to expose the top surface of the primary magnetic pole 30 to be flatten. Hence, while the top surface of the primary magnetic pole 30 is covered with the shield layer 77 with only the second nonmagnetic material layer 51 therebetween, the side surfaces of the primary magnetic pole 30 are covered with the shield layer 77 with the first nonmagnetic material layer 50 and the second nonmagnetic material layer 51 therebetween. Thus, the distance W1 (see FIG. 3) in the direction perpendicular to the thickness direction between the side surfaces 30a and 30b of the primary magnetic pole 30 and the side shield layer 77 (side shield portions 77a) can be set longer than the distance W2 in the thickness direction between the top surface 30c of the primary magnetic pole 30 and the shield layer 77 (upper shield portion 77b). Thus, the shield layer 77 is prevented from excessively absorbing recording flux generated from the primary magnetic pole 30.

In general, it is difficult to deposit the nonmagnetic layer at a large thickness over the side surface of the primary magnetic pole 30, and accordingly insulation failure is liable to occur between the primary magnetic pole 30 and the shield layer 77. In the method shown in FIGS. 5A to 14B, however, the shield layer 77 is disposed at the side surfaces of the primary magnetic pole 30 with the first nonmagnetic material layer 50 and the second nonmagnetic material layer 51 therebetween to enhance the insulation between the primary magnetic pole 30 and the shield layer 77.

The perpendicular magnetic recording head H1b manufactured through the steps shown in FIGS. 15 to 17 also produces these effects.

A method for manufacturing the perpendicular magnetic recording head H2 shown in FIG. 4 will now be described with reference to FIGS. 18 to 25. FIGS. 18 to 25 are fragmentary front view from the medium-opposing surface of the perpendicular magnetic recording head H2. The following description omits the process for forming layers under the separation layer 27 (in the direction opposite to the Z direction) and illustrates the process for forming the layers from the separation layer 27 to the shield layer 77. Also, in the fragmentary front views of FIGS. 18 to 25, the first magnetic portion 60 is shown by only the primary magnetic pole 30 without the yoke 31, for ease of comprehension.

Figure 18:
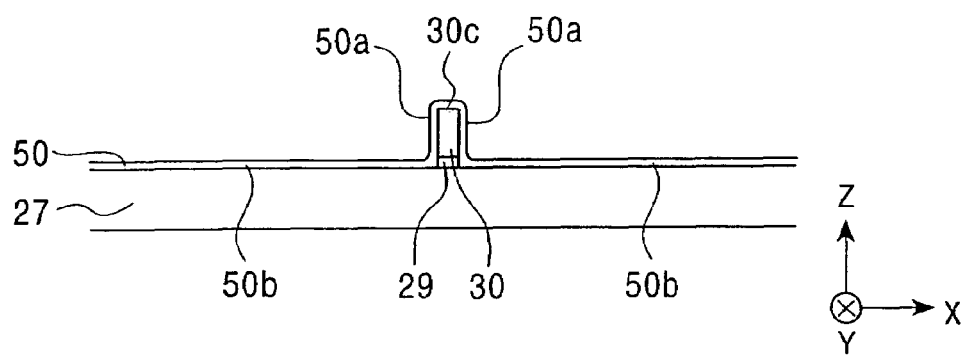
FIG. 18 is a representation of a step of a process for manufacturing the perpendicular magnetic recording head shown in FIG. 4.

First, as shown in FIG. 18, the first magnetic portion 60 is formed over the separation layer 27 by plating, using the plating base layer 29 as an electrode, in the same step as shown in FIGS. 5A and 5B. Then, the first nonmagnetic material layer 50 is formed over the top surface 30c and the side surfaces 30a and 30b of the primary magnetic pole 30 and the upper surface 27a of the separation layer 27 in the same step as shown in FIGS. 7A to 7C. For the first nonmagnetic material layer 50, a material hard to remove by RIE of a fourth nonmagnetic material layer 81 (described later with reference to FIG. 23) is used. For example, at least one selected from among $Al_2O_3$, AlSiO, and AlSiON is used. In this instance, the first nonmagnetic material layer 50 has vertical portions 50a in contact with the side surfaces 30a and 30b of the primary magnetic pole 30 and horizontal portions 50b opposing the separation layer 27 and extending in the direction perpendicular to the vertical portions 50a.

Figure 19:
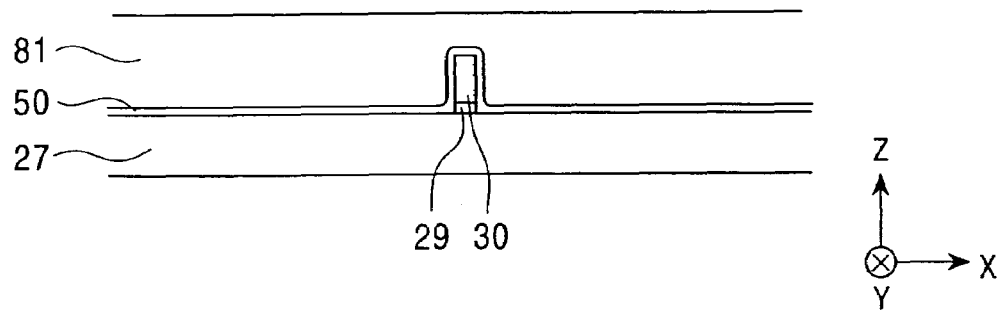
FIG. 19 is a representation of the step following the step shown in FIG. 18.
Figure 20:
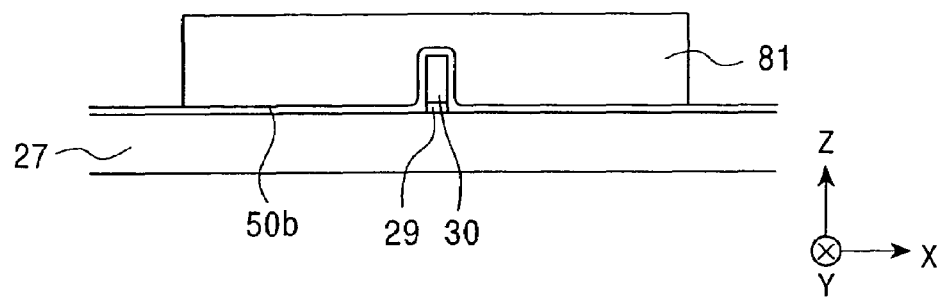
FIG. 20 is a representation of the step following the step shown in FIG. 19.

Turning to FIG. 19, a fourth nonmagnetic material layer 81 is formed of at least one material selected from the group consisting of $SiO_2$, $Ta_2O_5$, Ti, W, Cr, Ta, and oxides and nitrides of Ti, W, Cr, and Ta over the first nonmagnetic material layer 50. The material of the fourth nonmagnetic material layer 81 can be removed by RIE in the step shown in FIG. 23. The fourth nonmagnetic material layer 81 is disposed so as to cover the primary magnetic pole 30 and the first nonmagnetic material layer 50 in three directions from above to the sides, as shown in FIG. 19. After forming a resist layer (not shown in the figure) on the fourth nonmagnetic material layer 81, the fourth nonmagnetic material layer 81 is partially removed by RIE or the like to form into a shape shown in FIG. 20. In this instance, the first nonmagnetic material layer 50 is left without being removed.

Figure 21:
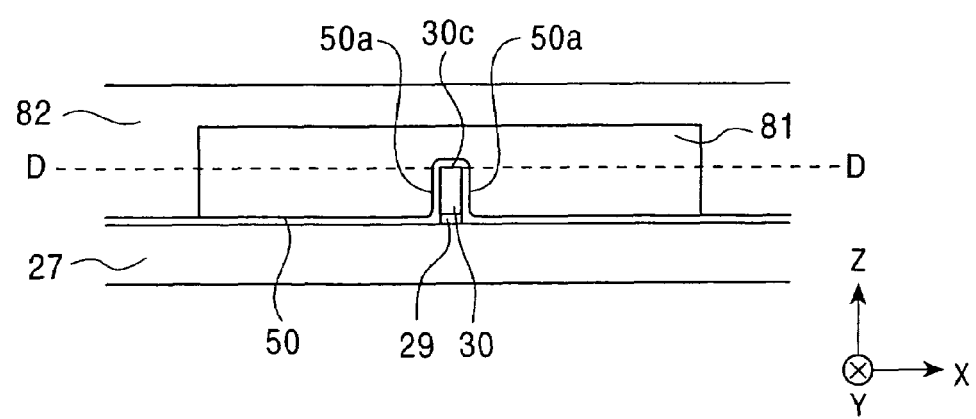
FIG. 21 is a representation of the step following the step shown in FIG. 20.

Turning to FIG. 21, a fifth nonmagnetic material layer 82 is formed of at least one material selected from among $Al_2O_3$, AlSiO, and AlSiON over the fourth nonmagnetic material layer 81. The fifth nonmagnetic material layer 82 is disposed so as to cover the fourth nonmagnetic material layer 81 in three directions from above to the sides, as shown in FIG. 21. Then, the third nonmagnetic material layer 82 is cut along line D-D in FIG. 21 by CMP.

Figure 22:
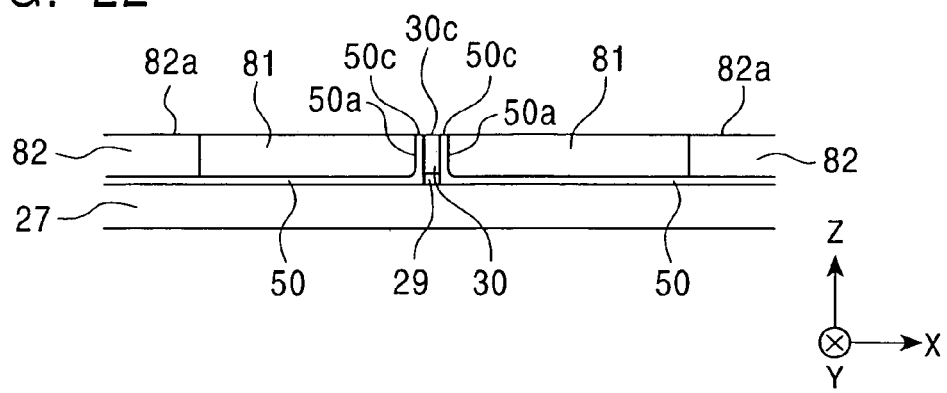
FIG. 22 is a representation of the step following the step shown in FIG. 21.

When the fifth nonmagnetic material layer 82 is cut along line D-D, part of the fourth nonmagnetic material layer 81 and part of the vertical portions 50a of the first nonmagnetic material layer 50, and the upper region of the primary magnetic pole 30 are removed together. Consequently, as shown in FIG. 22, the upper surface 82a of the fifth nonmagnetic material layer 82, the upper surface of the fourth nonmagnetic material layer 81, the top surface 50c of the vertical portion 50a of the first nonmagnetic material layer 50, and the top surface 30c of the primary magnetic pole 30 are flush with one another. Thus, the top surface 30c of the primary magnetic pole 30 is flattened. The remaining fifth nonmagnetic material layer 82 defines the shield bank layer 80.

Figure 23:
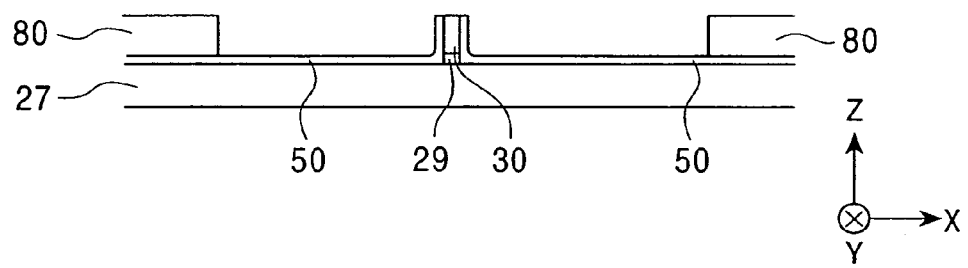
FIG. 23 is a representation of the step following the step shown in FIG. 22.

Turning to FIG. 23, the fourth nonmagnetic material layer 81 is removed by RIE. Since the first nonmagnetic material layer 50 is made of a material hard to remove by RIE, it is left without being removed.

Figure 24:
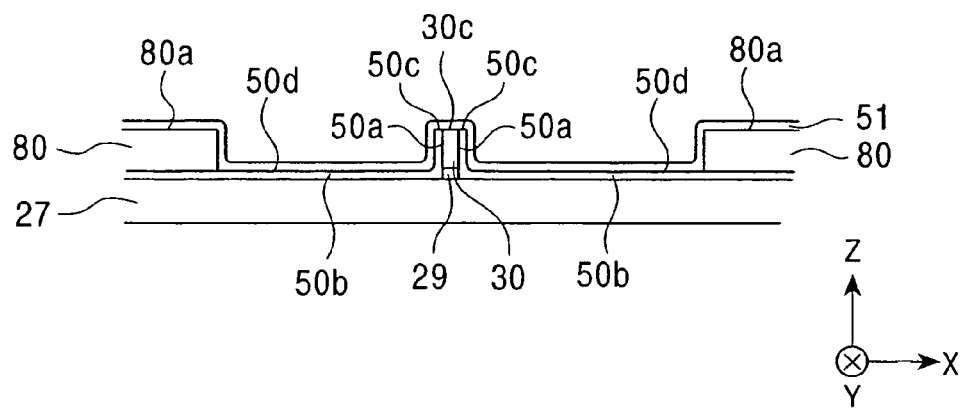
FIG. 24 is a representation of the step following the step shown in FIG. 23.

Then, a second nonmagnetic material layer 51 (gap layer) is formed of an inorganic material, such as $Al_2O_3$ or $SiO_2$, over the surfaces exposed by removing the fourth nonmagnetic material layer 81, that is, over the top surface 30c of the primary magnetic pole layer 30, the top surfaces 50c, vertical portions 50a, and upper surfaces 50d of horizontal portions 50b of the first nonmagnetic material layer 50, and the upper surfaces 80a of the shield bank layer 80, as shown in FIG. 24.

Figure 25:
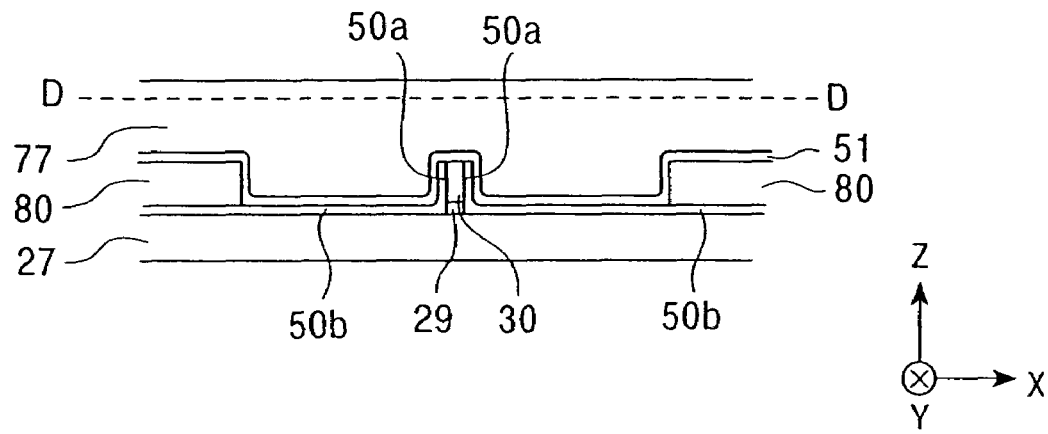
FIG. 25 is a representation of the step following the step shown in FIG. 24.
Figure 26:
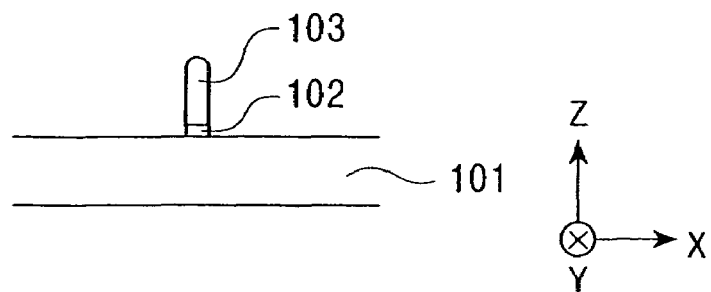
FIG. 26 is a representation of a step of a process for manufacturing a known perpendicular magnetic recording head.
Figure 27:
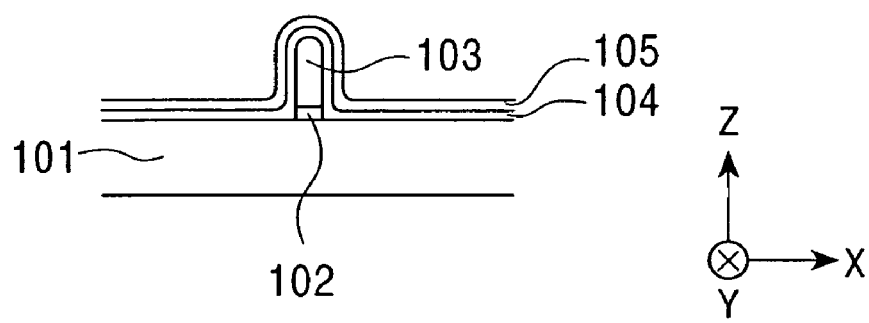
FIG. 27 is a representation of the step following the step shown in FIG. 26.
Figure 28:
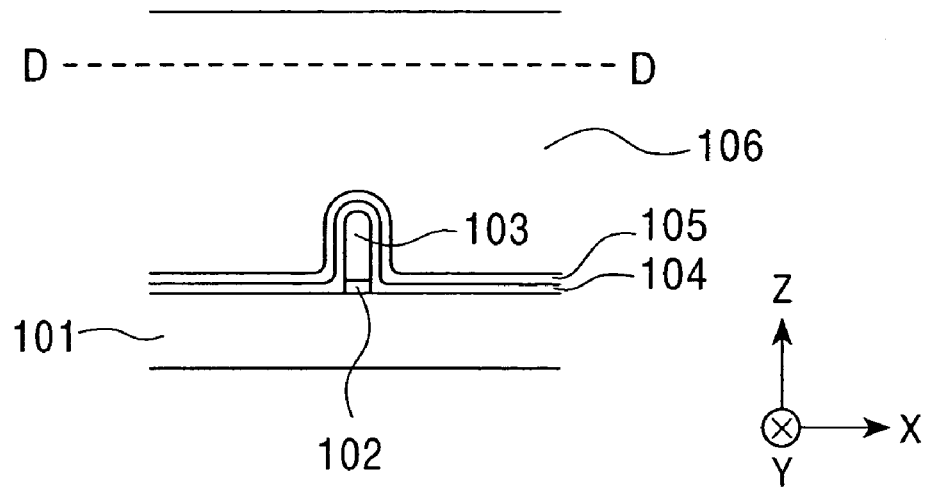
FIG. 28 is a representation of the step following the step shown in FIG. 27.
Figure 29:
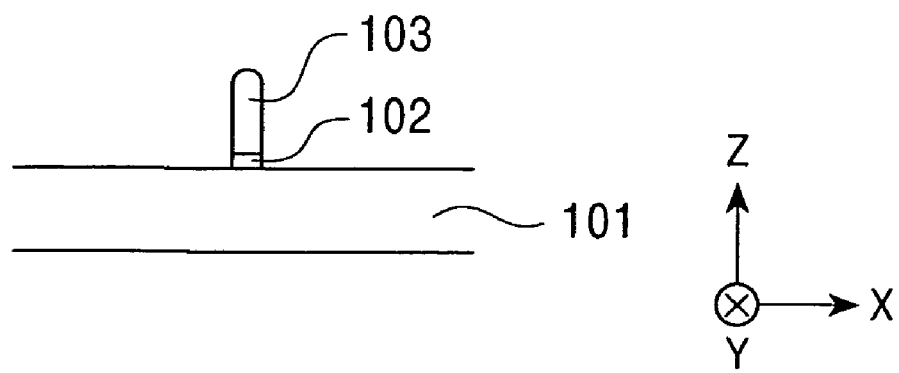
FIG. 29 is a representation of a step of another process for manufacturing a known perpendicular magnetic recording head.
Figure 30:
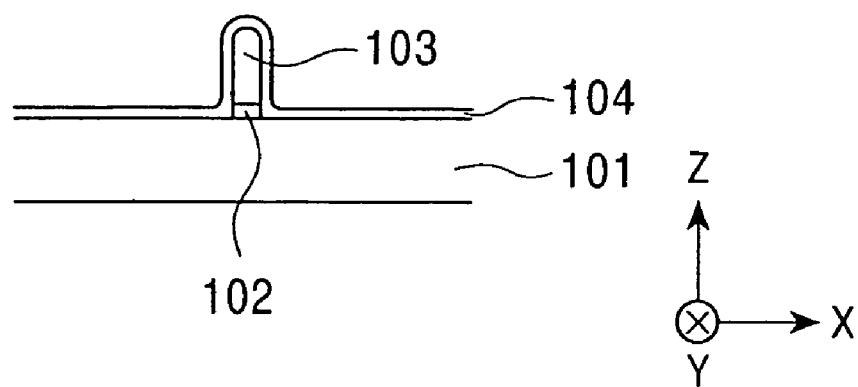
FIG. 30 is a representation of the step following the step shown in FIG. 29.
Figure 31:
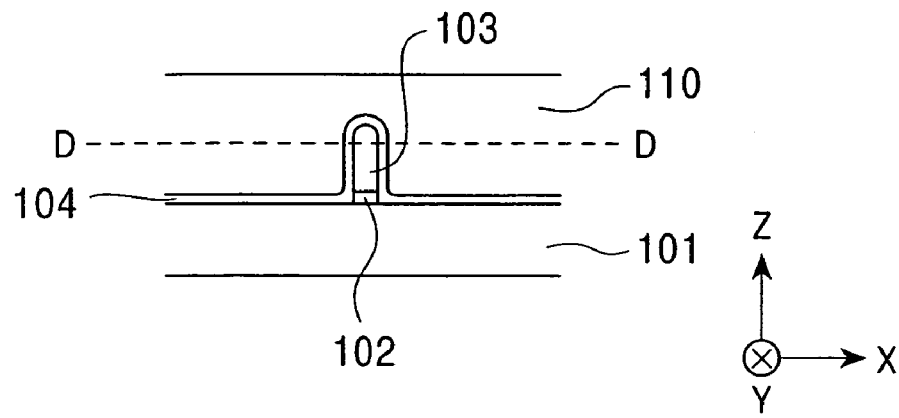
FIG. 31 is a representation of the step following the step shown in FIG. 30.
Figure 32:
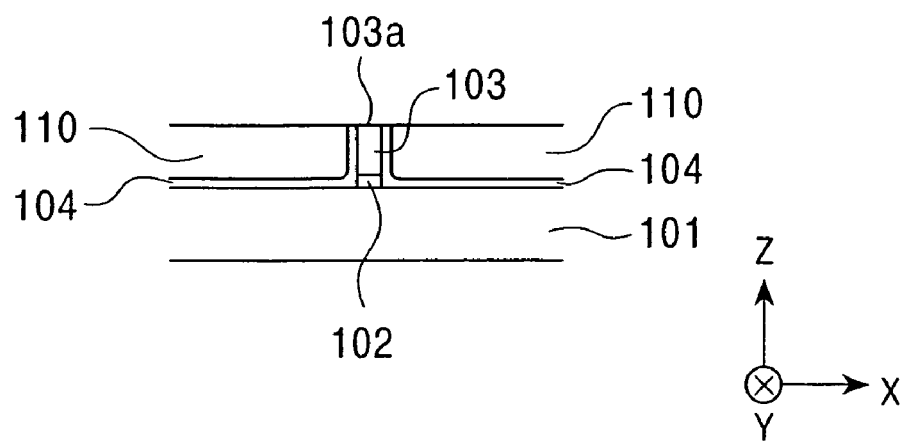
FIG. 32 is a representation of the step following the step shown in FIG. 31.
Figure 33:
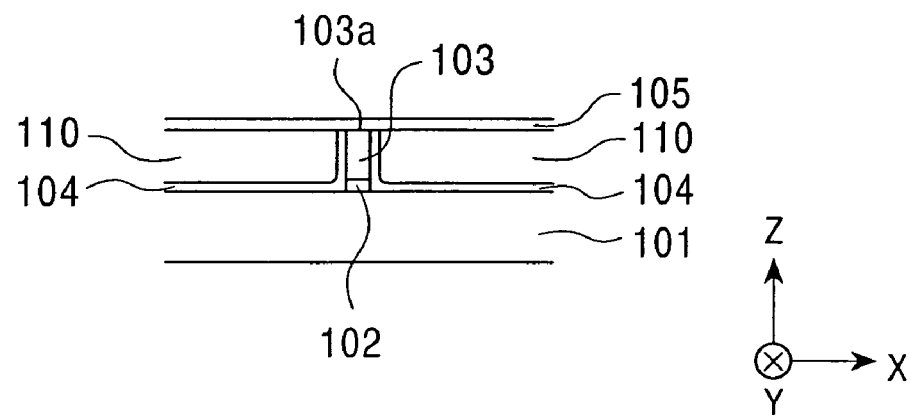
FIG. 33 is a representation of the step following the step shown in FIG. 32.
Figure 34:
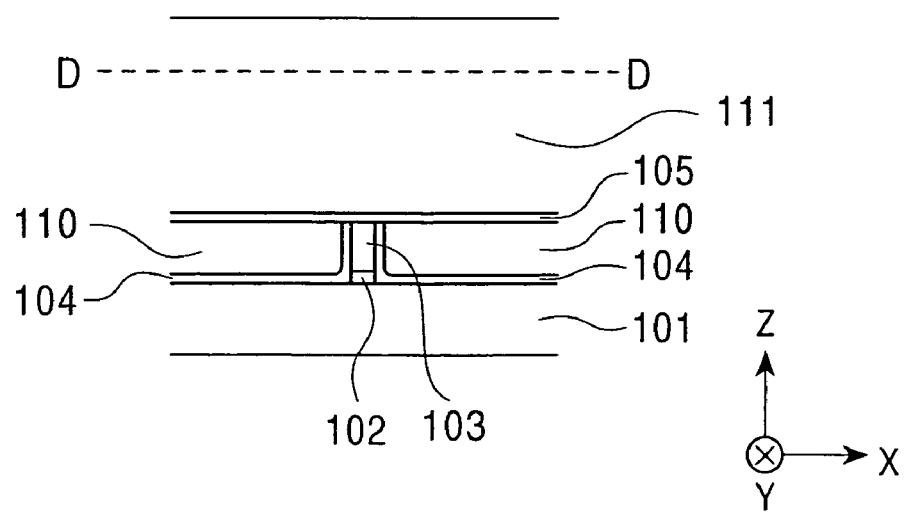
FIG. 34 is a representation of the step following the step shown in FIG. 33.

Turning to FIG. 25, the shield layer is formed by plating a magnetic material, such as a NiFe alloy, in the same step as shown in FIGS. 12A to 14B. The shield layer 77 is cut along line D-D shown in FIG. 25 to flatten its upper surface.

After the step shown in FIG. 25, the coil insulating underlayer 35, the coil layer 36, the coil insulating layer 38, the secondary magnetic pole 34 serving as the second magnetic portion 61, and the protective layer 41, as shown in FIG. 1A, are formed by a know method. Thus, the perpendicular magnetic recording head H2 is completed. The materials of the coil insulating underlayer 35, the coil layer 36, the coil insulating layer 38, the secondary magnetic pole 34, and the protective layer 41 have been described with reference to FIGS. 1A, 2, and 3, and the description is omitted here.

In the method shown in FIGS. 18 to 25, the shield bank layer 80 made of at least one inorganic insulating material selected from among $Al_2O_3$, AlSiO, and AlSiON is provided with a predetermined distance L1 from the side surfaces of the primary magnetic pole 30, on the first nonmagnetic material layer 50. Accordingly, the distance between the shield layer 77 or the secondary magnetic pole 34 and the upper shield layer 26 of the reading portion $H_R$ is increased by the thickness t1 of the shield bank layer 80. Thus, this method produces not only the same effects as in the method shown in FIGS. 5A to 14B, but also provides a perpendicular magnetic recording head exhibiting superior insulation between the shield layer 77 or the secondary magnetic pole 34 and the upper shield layer 26 of the reading portion $H_R$. Hence, the shield bank layer 80 is disposed only in the region where high insulation is required, but not in regions where high insulation is not necessary, to enhance the insulation in such a desired region.

In addition, since the shield bank layer 80 reduces the size of the shield layer 77 by its size, the leakage of magnetic flux in the perpendicular magnetic recording head H2 can be prevented. Consequently, deterioration of the recording ability can be prevented. Furthermore, the shield bank layer 80 can disperse the flux concentrated on the ends (not shown in the figure) of the shield layer 77.

In the step shown in FIG. 19 of the method for forming the perpendicular magnetic recording head H2, the fourth nonmagnetic material layer 81 may be formed of a conductive material over the first nonmagnetic material layer 50. Since the fourth nonmagnetic material layer 81 is removed in the step shown in FIG. 23 by RIE, it does not affect the insulation of the resulting perpendicular magnetic recording head H2.

In the method for manufacturing the perpendicular magnetic recording head H2, the secondary magnetic pole 34 and the shield layer 77 may be integrally formed after the coil insulating underlayer 35, the coil layer 36, and the coil insulating layer 38 are provided on the second nonmagnetic material layer 51, and subsequently the protective layer 41 may be formed over the secondary magnetic pole 34.

In the above-described embodiments illustrate a primary magnetic pole 30 disposed below a secondary magnetic pole 3. However, the primary magnetic pole 30, the first nonmagnetic material layer 50, and the shield layer 77 may be provided after forming the secondary magnetic pole 34 on the separation layer 27 by plating or the like and subsequently forming the coil insulating underlayer 35, the coil layer 36, and the coil insulating layer 38 over the secondary magnetic pole 34.

What is claimed is:

1. A method for manufacturing a perpendicular magnetic recording head which includes: a first magnetic portion including a primary magnetic pole with a track width, the primary magnetic pole being disposed at a surface opposing a recording medium; a second magnetic portion with a width larger than the track width, separated from the first magnetic portion by a gap in a region and directly or indirectly coupled with the first magnetic portion in a region away in a height direction from the surface opposing the recording medium; a coil layer disposed in the gap, wound around the first magnetic portion, and in which the first magnetic portion generates a magnetic field to record magnetic data onto the recording medium, the method comprising:

(a) forming the first magnetic portion of a magnetic material;
(b) flattening at least a top surface of the primary magnetic pole;
(c) providing a nonmagnetic material layer at least over the primary magnetic pole from the top surface to sides of the primary magnetic pole;

wherein step (c) comprises:

(i) forming a first nonmagnetic material layer over the primary magnetic pole from the top surface to the sides of the primary magnetic pole;
(ii) cutting an upper portion of the first nonmagnetic material layer so as to expose the top surface of the primary magnetic pole, thereby flattening the top surface of the primary magnetic pole; and
(iii) forming a second nonmagnetic material layer over the primary magnetic pole and the remaining first nonmagnetic material layer; and (d) forming a shield layer at least over the primary magnetic pole and at the sides of the primary magnetic pole in a single piece with the nonmagnetic material layer therebetween, wherein the nonmagnetic material layer is formed so that a thickness thereof in the width direction on the side surfaces of the primary magnetic pole is larger than a thickness thereof on the top surface of the primary magnetic pole.

2. The method according to claim 1, wherein step (c) further comprises:

(iv) forming a third nonmagnetic material layer over the first nonmagnetic material layer before sub step (ii), wherein in sub step (ii), the first nonmagnetic material layer and the third nonmagnetic material layer are cut until the top surface of the primary magnetic pole is exposed, thereby flattening the top surfaces of the primary magnetic pole and the third nonmagnetic material layer; and
(v) removing the third nonmagnetic material layer before sub step (iii).

3. The method according to claim 2, wherein the third nonmagnetic material layer is formed beyond a height of the primary magnetic pole.

4. The method according to claim 2, wherein the third nonmagnetic material layer is formed of a material capable of being etched by reactive ion etching.

5. The method according to claim 2, wherein the first nonmagnetic material layer is formed of at least one material selected from the group consisting of $Al_2O_3$, AlSiO, and AlSiON, and the third nonmagnetic material layer is formed of at least one material selected from the group consisting of $SiO_2$, $Ta_2O_5$, Ti, W, Cr, Ta, and oxides and nitrides of Ti, W, Cr, and Ta.

* * * * *